(12) United States Patent
Trevor et al.

(10) Patent No.: US 10,687,046 B2
(45) Date of Patent: Jun. 16, 2020

(54) TRAJECTORY SMOOTHER FOR GENERATING MULTI-VIEW INTERACTIVE DIGITAL MEDIA REPRESENTATIONS

(71) Applicant: Fyusion, Inc., San Francisco, CA (US)

(72) Inventors: Alexander Jay Bruen Trevor, San Francisco, CA (US); Chris Beall, San Francisco, CA (US); Stefan Johannes Josef Holzer, San Mateo, CA (US); Radu Bogdan Rusu, San Francisco, CA (US); Krunal Ketan Chande, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 40 days.

(21) Appl. No.: 16/178,205

(22) Filed: Nov. 1, 2018

(65) Prior Publication Data

US 2019/0313085 A1 Oct. 10, 2019

Related U.S. Application Data

(60) Provisional application No. 62/653,283, filed on Apr. 5, 2018.

(51) Int. Cl.
*H04N 13/282* (2018.01)
*H04N 5/232* (2006.01)
*H04N 13/139* (2018.01)

(52) U.S. Cl.
CPC ....... *H04N 13/282* (2018.05); *H04N 5/23238* (2013.01); *H04N 13/139* (2018.05)

(58) Field of Classification Search
CPC ............... H04N 13/282; H04N 13/139; H04N 5/23238; H04N 5/23218
See application file for complete search history.

(56) References Cited

U.S. PATENT DOCUMENTS

| 5,926,190 A | 7/1999 | Turkowski et al. |
| 6,252,974 B1 | 6/2001 | Martens et al. |
| (Continued) | | |

FOREIGN PATENT DOCUMENTS

| EP | 2259599 A1 | 12/2011 |
| WO | 2017139061 A1 | 8/2017 |

OTHER PUBLICATIONS

"Int'l Application Serial No. PCT/US19/25806, Int'l Search Report and Written Opinion dated Jul. 31, 2019", 12 pgs.

*Primary Examiner* — James M Pontius
(74) *Attorney, Agent, or Firm* — Kwan & Olynick LLP

(57) ABSTRACT

Various embodiments of the present invention relate generally to systems and methods for analyzing and manipulating images and video. In particular, a multi-view interactive digital media representation (MVIDMR) of object can be generated from live images of the object captured from a hand-held camera. Methods are described where image data associated with the images capture from the hand-held camera are manipulated to generate a more desirable MVIDMR of the object. In particular, the image data can be manipulated so that it appears as if the camera traveled a smoother trajectory during the capture of the images which can provide a smoother output of the MVIDMR. In embodiment, key point matching within the image data and, optionally, IMU data from a sensor package on the camera can be used to generate constraints used in a factor graph optimization that is used to generate a smoother trajectory of the camera.

21 Claims, 15 Drawing Sheets

(56) References Cited

U.S. PATENT DOCUMENTS

| | | |
|---|---|---|
| 8,078,004 B2 | 12/2011 | Kang et al. |
| 10,194,089 B2 * | 1/2019 | Nash .................. H04N 5/23241 |
| 2002/0094125 A1 | 7/2002 | Guo |
| 2006/0188147 A1 | 8/2006 | Rai et al. |
| 2008/0106593 A1 | 5/2008 | Arfvidsson et al. |
| 2008/0152258 A1 | 6/2008 | Tulkki |
| 2008/0201734 A1 | 8/2008 | Lyon et al. |
| 2008/0225132 A1 | 9/2008 | Inaguma |
| 2008/0246759 A1 | 10/2008 | Summers |
| 2009/0058878 A1 * | 3/2009 | Sasagawa ............ H04N 13/243 345/593 |
| 2009/0135244 A1 | 5/2009 | Kim et al. |
| 2009/0263045 A1 | 10/2009 | Szeliski et al. |
| 2009/0303343 A1 | 12/2009 | Drimbarean et al. |
| 2010/0033553 A1 | 2/2010 | Levy |
| 2010/0171691 A1 | 7/2010 | Cook et al. |
| 2011/0254835 A1 | 10/2011 | Segal |
| 2011/0261050 A1 | 10/2011 | Smolic et al. |
| 2012/0019557 A1 | 1/2012 | Aronsson et al. |
| 2012/0147224 A1 | 6/2012 | Takayama |
| 2012/0242787 A1 | 9/2012 | Oh |
| 2013/0155180 A1 | 6/2013 | Wantland et al. |
| 2013/0162634 A1 | 6/2013 | Baik |
| 2013/0250045 A1 | 9/2013 | Ki et al. |
| 2014/0087877 A1 | 3/2014 | Krishnan |
| 2014/0253436 A1 | 9/2014 | Petersen |
| 2014/0307045 A1 | 10/2014 | Richardt et al. |
| 2015/0130799 A1 | 5/2015 | Holzer et al. |
| 2015/0130800 A1 | 5/2015 | Holzer et al. |
| 2015/0130894 A1 | 5/2015 | Holzer et al. |
| 2015/0134651 A1 | 5/2015 | Holzer et al. |
| 2015/0138190 A1 | 5/2015 | Holzer et al. |
| 2015/0339846 A1 | 11/2015 | Holzer et al. |
| 2017/0018054 A1 | 1/2017 | Holzer et al. |
| 2017/0018055 A1 | 1/2017 | Holzer et al. |
| 2017/0018056 A1 | 1/2017 | Holzer et al. |
| 2017/0084001 A1 | 3/2017 | Holzer et al. |
| 2017/0094158 A1 * | 3/2017 | Van Olst ............ H04N 5/23219 |
| 2017/0109888 A1 | 4/2017 | De Lima et al. |
| 2017/0201672 A1 * | 7/2017 | Hayashi .................. H04N 5/232 |
| 2017/0230585 A1 * | 8/2017 | Nash .................. H04N 5/23241 |
| 2018/0338126 A1 | 11/2018 | Trevor et al. |
| 2018/0338128 A1 | 11/2018 | Trevor et al. |

* cited by examiner

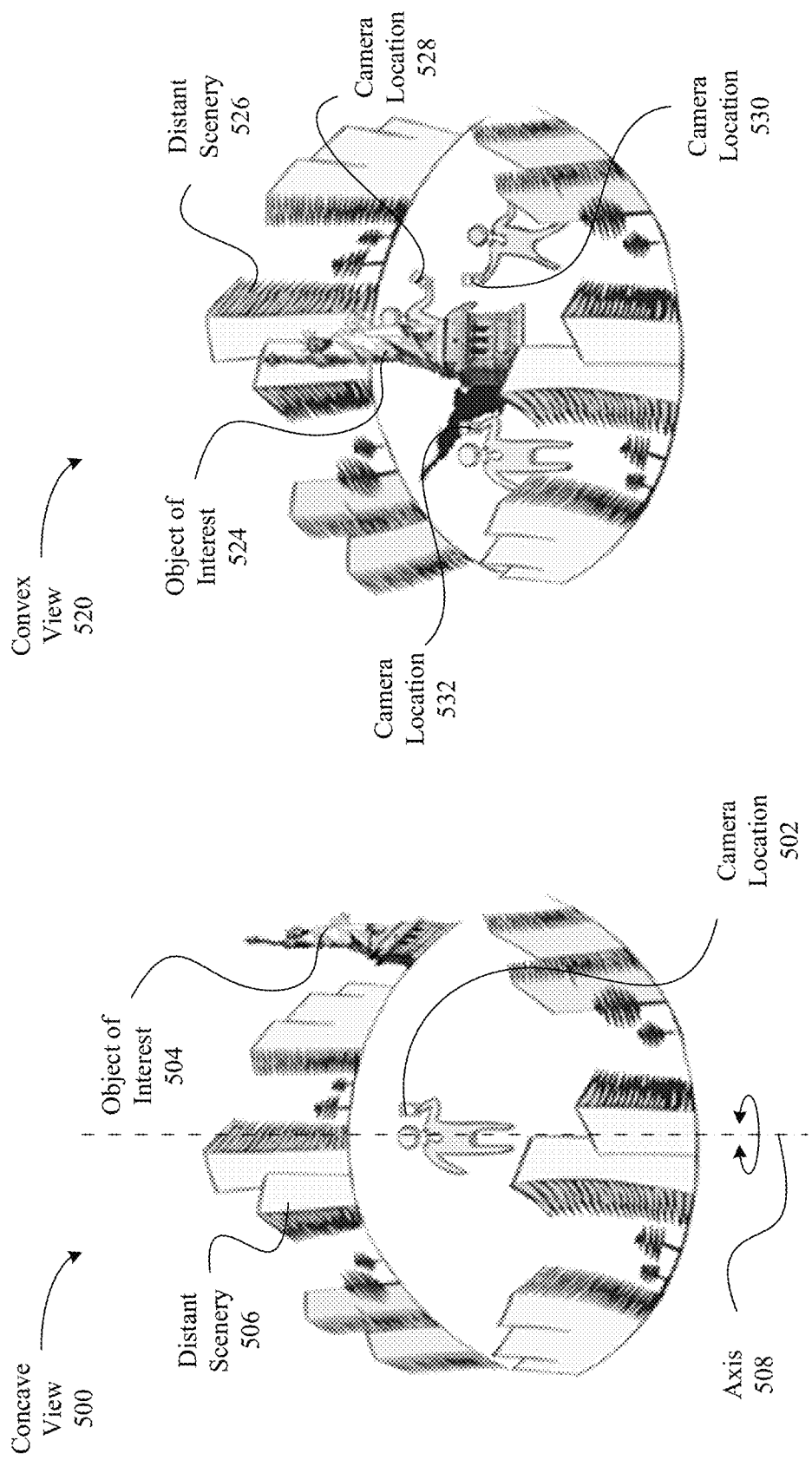

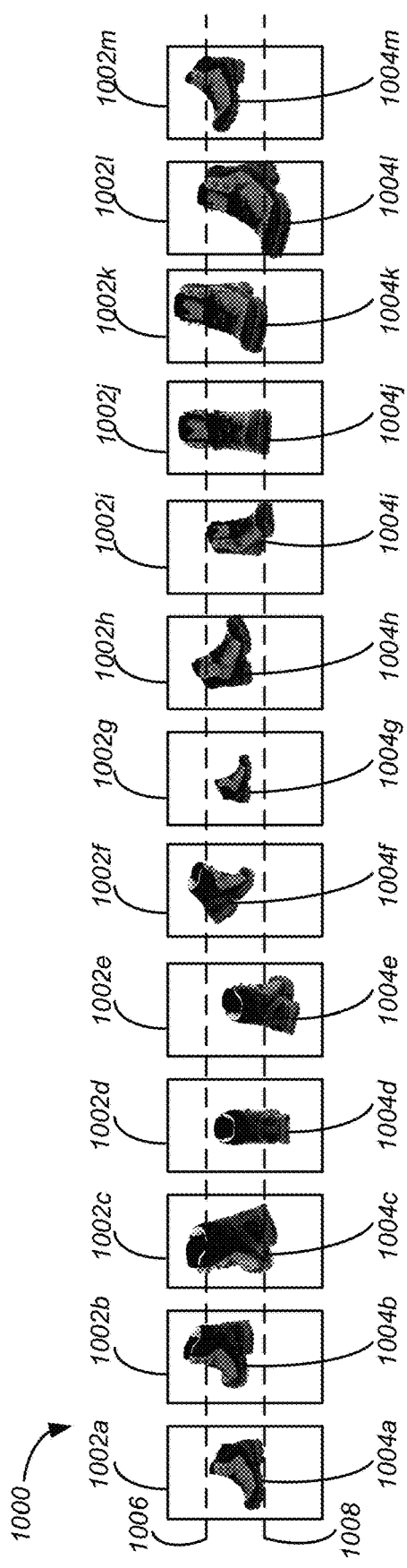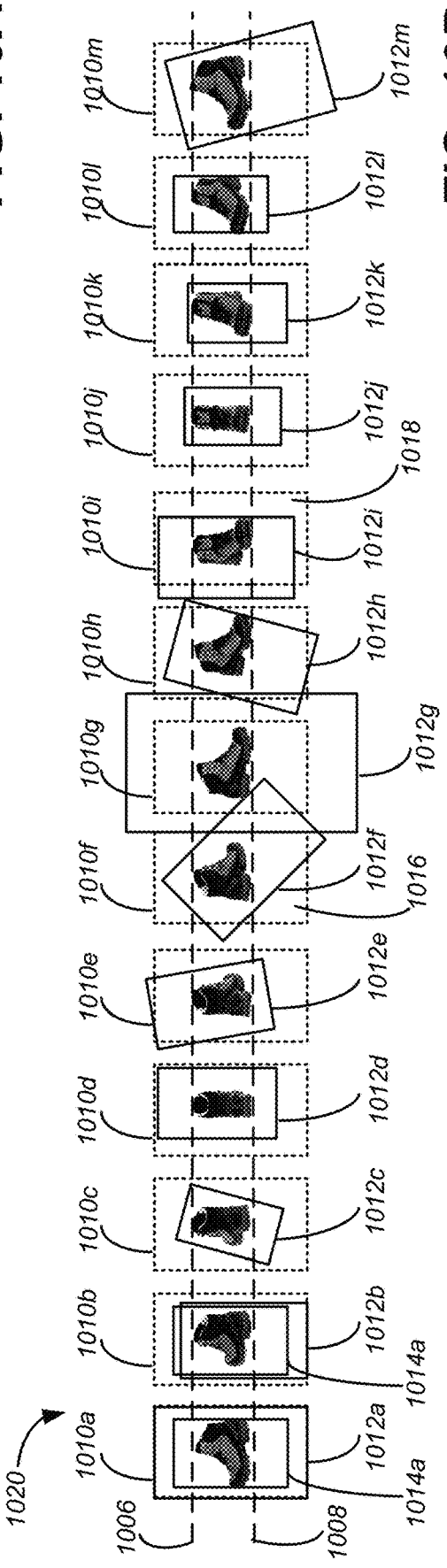

TRAJECTORY SMOOTHER FOR GENERATING MULTI-VIEW INTERACTIVE DIGITAL MEDIA REPRESENTATIONS

CROSS-REFERENCE TO RELATED APPLICATIONS

This patent document claims priority to U.S. Provisional Application No. 62/653,283 by Trevor et al., titled "Trajectory Smoother for Generating Multi-View Interactive Digital Media Representations," filed on Apr. 5, 2018. U.S. Provisional Application No. 62/653,283 is incorporated by reference herein in its entirety for all purposes.

TECHNICAL FIELD

The present disclosure relates to generating and manipulating multi-view interactive digital media representations.

With modern computing platforms and technologies shifting towards mobile and wearable devices that include camera sensors as native acquisition input streams, the desire to record and preserve moments digitally in a different form than more traditional two-dimensional (2D) flat images and videos has become more apparent. Traditional digital media formats typically limit their viewers to a passive experience. For instance, a 2D flat image can be viewed from one angle and is limited to zooming in and out. Accordingly, traditional digital media formats, such as 2D flat images, do not easily lend themselves to reproducing memories and events with high fidelity.

Current predictions (Ref: KPCB "Internet Trends 2012" presentation") indicate that every several years the quantity of visual data that is being captured digitally online will double. As this quantity of visual data increases, so does the need for much more comprehensive search and indexing mechanisms than ones currently available. Unfortunately, neither 2D images nor 2D videos have been designed for these purposes. Accordingly, improved mechanisms that allow users to view and index visual data, as well as query and quickly receive meaningful results from visual data are desirable.

OVERVIEW

Various embodiments of the present invention relate generally to systems and methods for analyzing and manipulating images and video. According to particular embodiments, the spatial relationship between multiple images and video is analyzed together with other sensor data, for purposes of creating a representation referred to herein as a multi-view interactive digital media representations (MVIDMR). The multi-view interactive digital media representations can be output to a device with a display, such as a mobile device, tablet computer or laptop computer.

MVIDMRs can include images of an object from many different viewing angles. Images with viewing angles about a common axis can be grouped together. These images can be provided in a sequence where the viewing angle changes from image to image in the sequence in an orderly manner. Thus, as the sequence of images is viewed on a display, the object can appear to rotate about the common axis. In particular embodiments, a multi-view interactive digital media representation can be provided with images with viewing angles about one or more axes. Thus, when viewed the object in the MVIDMR can appear to rotate about the one or more axes. In one embodiment, when the plurality of images is output to a display, the object can appear to undergo a 3-D rotation through an angular view amount where the 3-D rotation of the object is generated without a 3-D polygon model of the object.

In more detail, a MVIDMR can be generated from live images captured from a camera. The live images can include an object. In some instances, the camera can be hand-held and moved around an object to capture an angular view amount of the object in the live images. For example, an angular view of up to a full three hundred sixty degrees of an object can be captured.

When hand-held, during image capture along a trajectory, the camera can move closer or farther away from the object such that the object appears larger or smaller from one image to the next. Further, the camera can move up or down or left or right such that the object is not precisely centered in the image. In addition, the camera can roll around the optical axis such that the rotational orientation of the object changes in the frame. These motion effects associated with the camera can affect a playback quality of an MVIDMR of an object generated from the captured image data. In particular, the MVIDMR of the object can appear to move, such as rotate or jitter up and down, in an unsmooth manner.

To counter the camera motion effects, the live image data of the object can be manipulated during the MVIDMR generation process. In particular, the live image data can be manipulated so that it appears the camera travelled a "smoother" trajectory during image capture. For example, along a smoother trajectory the variations from image to image associated with the position of the object within the images changing, rotation of the object within the images changing or the size of the object within the images changing can be lessened. Thus, when the manipulated image data is used to generate an MVIDMR object, the motion of the object appears "smoother" when the MVIDMR of the object is output to a display.

In one embodiment, key point matching between images and, optionally, IMU data received from the camera can be used to smooth the trajectory of the camera using a factor graph. In particular, the key point matching between images and, optionally, the IMU data can be used to formulate error constraints for the factor graph where each image provides a node in the factor graph. The smoothing process can involve translating, rotating and/or scaling each image to minimize the errors determined from the error constraints. With additional manipulation, the translated, rotated and/or scaled images can be assembled into an MVIDMR.

In one embodiment, a method can be performed on a mobile device. The mobile device can include a processor, a memory, a camera, a plurality of sensors, a microphone and a touchscreen display. The mobile device can be used to capture live image data. During image capture, the mobile can be hand-held.

The method can be generally characterized as 1) receiving via an input interface on the mobile device a request to generate a multi-view interactive digital media representation of an object; 2) receiving a set of live images from the camera on the mobile device as the mobile device moves along a trajectory where an orientation of the camera varies along the trajectory such that the object in the set of live images can be captured from a plurality of camera views; 3) receiving sensor data from the plurality of sensors; 4) based upon the sensor data, determining at least an angular orientation about an optical axis of the camera for each of the live images; 5) determining key points on an object in each of the live images in the set of live images; 6) determining, between at least adjacent image pairs in the set of live images, correspondences between the key points in each of the image pairs; 7) based upon the angular orientation about the optical axis of each of the live images, generating a first error constraint for a factor graph; 8) based upon the correspondences between the key points in each of the image pairs, generating second error constraints for the factor graph; 9) based upon the first error constraint and the second error constraints for the factor graph, determining a translation operation, a rotation operation, a scaling operation or combinations thereof for each of the live images in the set of live images to generate a new set of images wherein changes from image to image in translational position, rotational position and size of the object within the new set of images are reduced as compared to the live images and 10) generating from the new set the images the multi-view interactive digital media representation wherein the multi-view interactive digital media representation includes a plurality of images wherein each of the plurality of images includes the object from a different camera view such that object appears to go through a 3-D motion.

BRIEF DESCRIPTION OF THE DRAWINGS

The disclosure may best be understood by reference to the following description taken in conjunction with the accompanying drawings, which illustrate particular embodiments of the present invention.

FIGS. 5A-5B illustrate examples of concave view and convex views, respectively, where both views use a back-camera capture style in accordance with embodiments of the present invention.

FIGS. 10A and 10B illustrate examples of image manipulations associated with camera trajectory smoothing in accordance with embodiments of the present invention.

DETAILED DESCRIPTION

Figure 1:
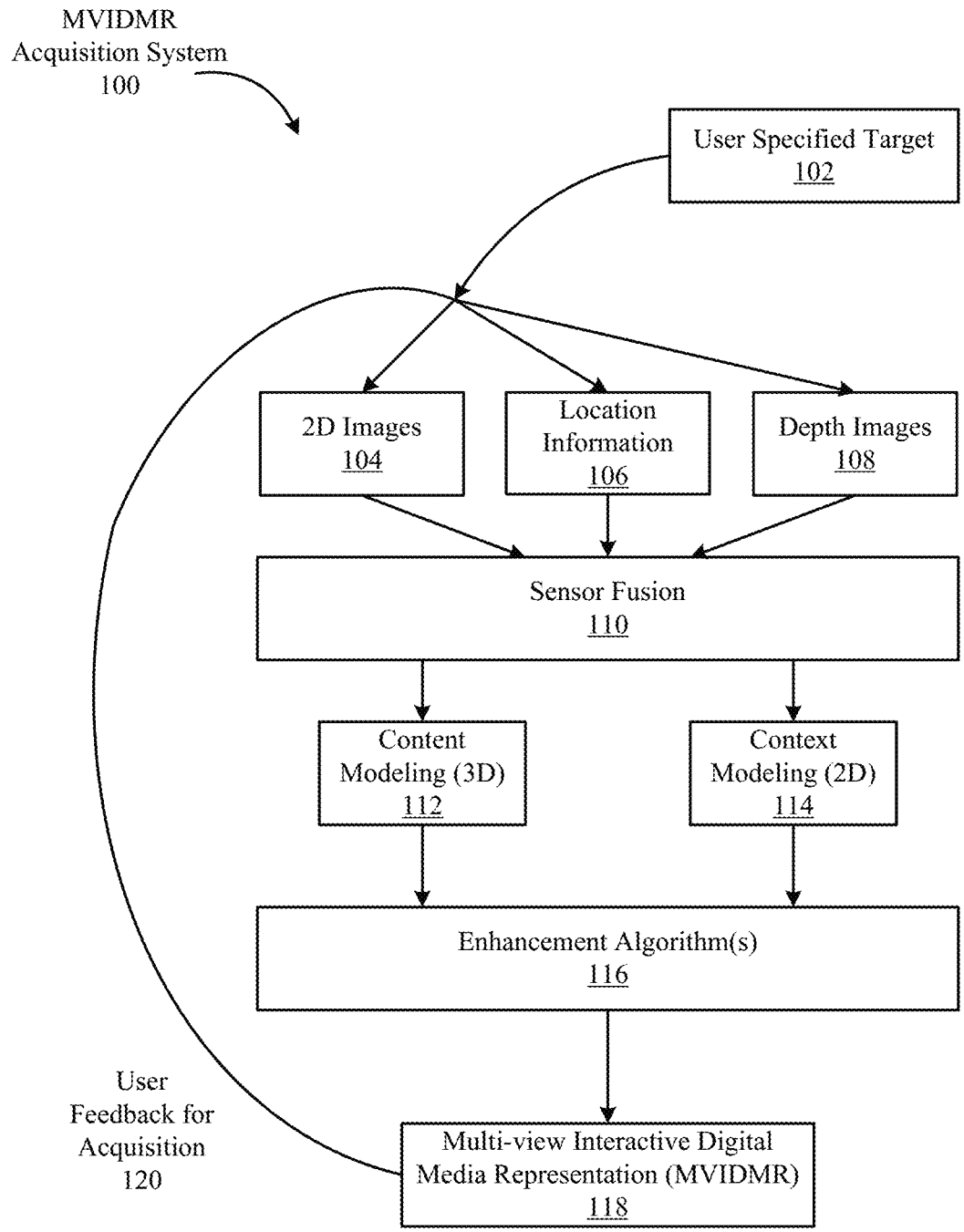
FIG. 1 illustrates an example of a multi-view interactive digital media representation acquisition system in accordance with embodiments of the present invention.

Reference will now be made in detail to some specific examples of the invention including the best modes contemplated by the inventors for carrying out the invention. Examples of these specific embodiments are illustrated in the accompanying drawings. While the present disclosure is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular embodiments of the present invention may be implemented without some or all of these specific details. In other instances, well known process operations have not been described in detail in order not to unnecessarily obscure the present invention.

Various aspects of the present invention relate generally to systems and methods for analyzing the spatial relationship between multiple images and video together with location information data, for the purpose of creating a single representation, a multi-view interactive digital media representation (MVIDMR), which eliminates redundancy in the data, and presents a user with an interactive and immersive active viewing experience. According to various embodiments, active is described in the context of providing a user with the ability to control the viewpoint of the visual information displayed on a screen.

Next, with respect to FIGS. 1-14 methods and apparatus for acquiring image data and generating a multi-view interactive digital media representations (MVIDMRs) are discussed. In particular, an example of MVIDMR system is discussed with respect to FIG. 1. An example of a process flow for generating an MVIDMR is described. With respect to FIG. 3, one example of multiple camera views that can be fused into a three-dimensional (3D) model to create an immersive experience is discussed. With respect to FIG. 4, one example of separating content and context for MVIDMR generation is described. Examples of concave view and convex views, respectively, where both views use a back-camera capture style are described with respect to FIGS. 5A and 5B.

Various capture modes, which can be used in MVIDMR generation, are discussed with respect to FIGS. 6A to 6D. With respect to FIG. 7, sensor packages, their integration into a mobile device and sensor With respect to FIGS. 8A to 8B, rotation metrics and angle measurements determined from IMU data are described. The rotation data and angle measurements can be utilized to manipulate captured image data to smooth an apparent trajectory of a camera.

With respect to FIGS. 9-13, trajectory smoothing for MVIDMR generation is discussed. In trajectory smoothing, the live image data captured from a motion of a camera, such as a hand-held camera, can be manipulated so that it appears as if the camera travelled along a smoother trajectory. The manipulated image data can used to generate an MVIDMR of an object. When the MVIDMR of the object is played back, the motion of the object can appear smoother as compared to an MVIDMR generated from the original live image data.

Figure 9:
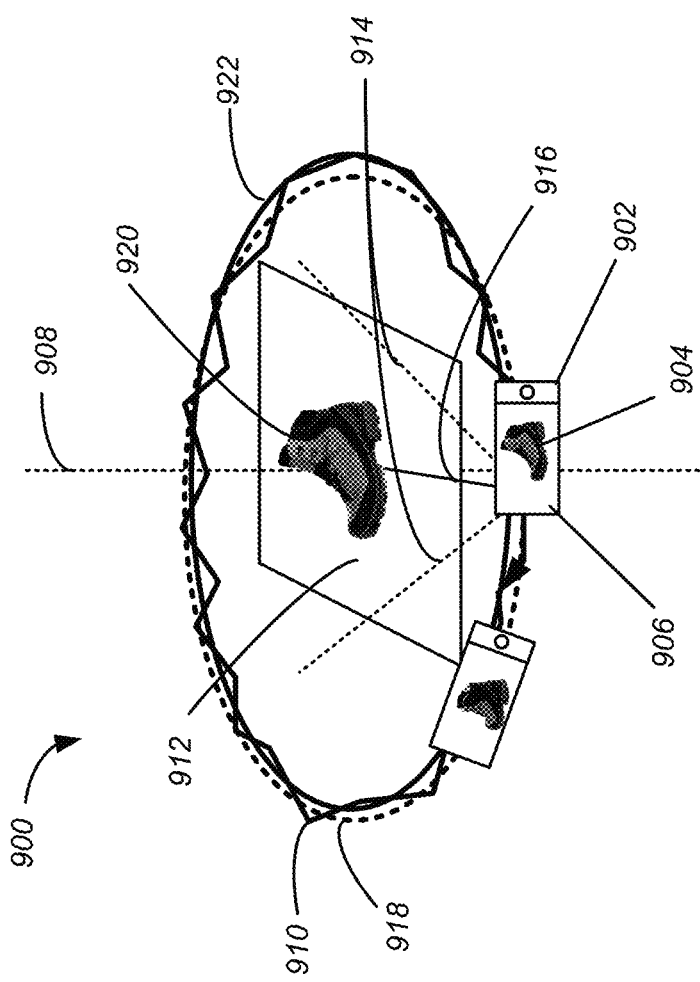
FIG. 9 illustrates an actual and smoothed camera trajectory during image capture for MVIDMR generation in accordance with embodiments of the present invention.

In particular, with respect to FIG. 9, a smoothed and unsmoothed camera trajectory is discussed. With respect to FIGS. 10A and 10B, image data encompassing a three hundred and sixty degree view of an object and image manipulations associated with trajectory smoothing are discussed. With respect to FIG. 11, some examples of error constraints associated with trajectory smoothing are discussed. The error constraints are related to transformations of images such as translation, rotation, scaling, homography, etc.

Figure 12:
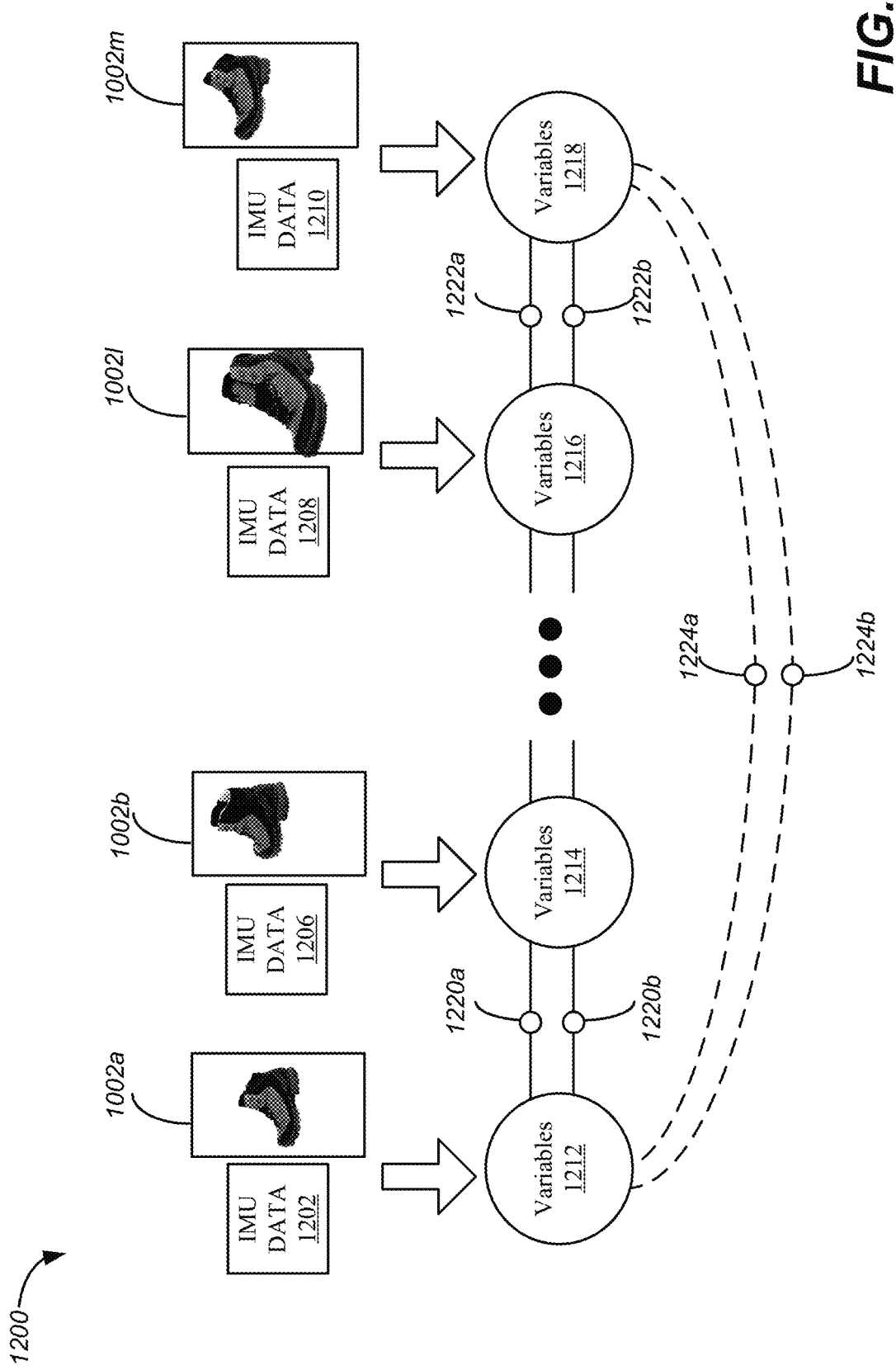
FIG. 12 illustrates camera trajectory smoothing formulated as a factor graph in accordance with embodiments of the present invention.

With respect to FIG. 12, trajectory smoothing of image data formulated as a factor graph is described. With respect to FIG. 13, a method of trajectory smoothing of image data for MVIDMR generation is discussed. Finally, with respect to FIG. 14, an example of an apparatus, which can be used during MVIDMR generation, is discussed.

With reference to FIG. 1, shown is one example of a multi-view interactive digital media representation acquisition system 100. In the present example embodiment, the multi-view interactive digital media representation acquisition system 100 is depicted in a flow sequence that can be used to generate a multi-view interactive digital media representation. According to various embodiments, the data used to generate a multi-view interactive digital media representation can come from a variety of sources.

In particular, data such as, but not limited to two-dimensional (2D) images 104 can be used to generate a multi-view interactive digital media representation. These 2D images can include color image data streams such as multiple image sequences, video data, etc., or multiple images in any of various formats for images, depending on the application. Another source of data that can be used to generate a multi-view interactive digital media representation includes environment information 106. This environment information 106 can be obtained from sources such as accelerometers, gyroscopes, magnetometers, GPS, WiFi, IMU-like systems (Inertial Measurement Unit systems), and the like. Some methods of utilizing the IMU to generate a multi-view interactive digital media representation are described in more detail below with respect to FIGS. 7, 8A and 8B. Yet another source of data that can be used to generate a multi-view interactive digital media representation can include depth images 108. These depth images can include depth, 3D, or disparity image data streams, and the like, and can be captured by devices such as, but not limited to, stereo cameras, time-of-flight cameras, three-dimensional cameras, and the like.

In the present example embodiment, the data can then be fused together at sensor fusion block 110. In some embodiments, a multi-view interactive digital media representation can be generated a combination of data that includes both 2D images 104 and environment information 106, without any depth images 108 provided. In other embodiments, depth images 108 and environment information 106 can be used together at sensor fusion block 110. Various combinations of image data can be used with environment information at 106, depending on the application and available data.

In the present example embodiment, the data that has been fused together at sensor fusion block 110 is then used for content modeling 112 and context modeling 114. As described in more detail with regard to FIG. 4, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. 4. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 112 and context modeling 114 can be generated by combining the image and location information data, as described in more detail with regard to FIG. 3.

According to various embodiments, context and content of a multi-view interactive digital media representation are determined based on a specified object of interest. In some examples, an object of interest is automatically chosen based on processing of the image and location information data. For instance, if a dominant object is detected in a series of images, this object can be selected as the content. In other examples, a user specified target 102 can be chosen, as shown in FIG. 1. It should be noted, however, that a multi-view interactive digital media representation can be generated without a user specified target in some applications.

In the present example embodiment, one or more enhancement algorithms can be applied at enhancement algorithm(s) block 116. In particular example embodiments, various algorithms can be employed during capture of multi-view interactive digital media representation data, regardless of the type of capture mode employed. These algorithms can be used to enhance the user experience. For instance, automatic frame selection, stabilization, view interpolation, filters, and/or compression can be used during capture of multi-view interactive digital media representation data. In some examples, these enhancement algorithms can be applied to image data after acquisition of the data. In other examples, these enhancement algorithms can be applied to image data during capture of multi-view interactive digital media representation data.

According to particular example embodiments, automatic frame selection can be used to create a more enjoyable multi-view interactive digital media representation. Specifically, frames are automatically selected so that the transition between them will be smoother or more even. This automatic frame selection can incorporate blur- and overexposure-detection in some applications, as well as more uniformly sampling poses such that they are more evenly distributed. In some implementations, interpolated frames may be added to create a more uniform sampling of frames.

In some example embodiments, stabilization can be used for a multi-view interactive digital media representation in a manner similar to that used for video. In particular, key frames in a multi-view interactive digital media representation can be stabilized to produce improvements such as smoother transitions, improved/enhanced focus on the content, etc. However, unlike video, there are many additional sources of stabilization for a multi-view interactive digital media representation, such as by using IMU information, depth information, computer vision techniques, direct selection of an area to be stabilized, face detection, and the like. In some implementations, for multi-view interactive digital media representations, there may be a specific object that is imaged from different view-points. Such images may need to be stabilized specifically for the specific object.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some examples, depth information, if available, can be used to provide stabilization for a multi-view interactive digital media representation. Because points of interest in a multi-view interactive digital media representation are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. In various examples, the content can stay relatively stable/visible even when the context changes.

According to various examples, computer vision techniques can also be used to provide stabilization for multi-view interactive digital media representations. For instance, keypoints can be detected and tracked. However, in certain scenes, such as a dynamic scene or static, nonplanar scene with parallax, no simple warp exists that can stabilize everything. Consequently, there is a trade-off in which certain aspects of the scene receive more attention to stabilization and other aspects of the scene receive less attention. Because a multi-view interactive digital media representation is often focused on a particular object of interest, a multi-view interactive digital media representation can be content-weighted so that the object of interest is maximally stabilized in some examples. In some implementations, different parts of images of multi-view interactive digital media representations may be stabilized differently. By way of example, images may be broken into different layers each of which may be stabilized.

Another way to improve stabilization in a multi-view interactive digital media representation includes direct selection of a region of a screen. For instance, if a user taps to focus on a region of a screen, then records a convex multi-view interactive digital media representation, the area that was tapped can be maximally stabilized. This allows stabilization algorithms to be focused on a particular area or object of interest.

In some examples, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

One having skill in the art can appreciate that the disclosed techniques can be applied using a wide variety of features for stabilization beyond keypoints. By way of example, some of such features may include edges, lines, shapes, regions, error constraints on pixel data, etc.

According to various examples, view interpolation can be used to improve the viewing experience. In particular, to avoid sudden "jumps" between stabilized frames, synthetic, intermediate views can be rendered on the fly. This can be informed by content-weighted keypoint tracks and, optionally, IMU information as described above, as well as by denser pixel-to-pixel matches. If depth information is available, fewer artifacts resulting from mismatched pixels may occur, thereby simplifying the process. As described above, view interpolation can be applied during capture of a multi-view interactive digital media representation in some embodiments. In other embodiments, view interpolation can be applied during multi-view interactive digital media representation generation.

In some examples, filters can also be used during capture or generation of a multi-view interactive digital media representation to enhance the viewing experience. Just as many popular photo sharing services provide aesthetic filters that can be applied to static, two-dimensional images, aesthetic filters can similarly be applied to surround images. However, because a multi-view interactive digital media representation is more expressive than a two-dimensional image, and three-dimensional information is available in a multi-view interactive digital media representation, these filters can be extended to include effects that are ill-defined in two dimensional photos. For instance, in a multi-view interactive digital media representation, motion blur can be added to the background (i.e. context) while the content remains crisp. In another example, a drop-shadow can be added to the object of interest in a multi-view interactive digital media representation.

In various examples, compression can also be used as an enhancement algorithm 116. In particular, compression can be used to enhance user-experience by reducing data upload and download costs. Because multi-view interactive digital media representations use spatial information, far less data can be sent for a multi-view interactive digital media representation than a typical video, while maintaining desired qualities of the multi-view interactive digital media representation. Specifically, the IMU, keypoint tracks, and user input, combined with the view interpolation described above, can all reduce the amount of data that must be transferred to and from a device during upload or download of a multi-view interactive digital media representation. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a multi-view interactive digital media representation 118 is generated after any enhancement algorithms are applied. The multi-view interactive digital media representation can provide a multi-view interactive digital media representation. In various examples, the multi-view interactive digital media representation can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, multi-view interactive digital media representations provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with multi-view interactive digital media representations that allow the multi-view interactive digital media representations to be indexed with a high degree of efficiency and accuracy; and the ability of the user to interact and change the viewpoint of the multi-view interactive digital media representation. In particular example embodiments, the characteristics described above can be incorporated natively in the multi-view interactive digital media representation, and provide the capability for use in various applications. For instance, multi-view interactive digital media representations can be used to enhance various fields such as e-commerce, visual search, 3D printing, file sharing, user interaction, and entertainment.

In some embodiments, a multi-view interactive digital media representation can use a series of 2-D images of a physical object taken from multiple viewpoints. When the 2-D images are output to a display, the physical object can appear to undergo a 3-D transformation, such as a rotation in 3-D space. This embodiment of the multi-view interactive digital media representation approach differs from using a full 3-D model of the physical object.

With a full 3-D model approach, the physical object can be represented as a series of polygons where the polygons are defined by points in a 3-D model space. After the 3-D model of the physical object is generated, the 3-D model can be initially positioned in the 3-D model space. Then, the position of the 3-D model can be adjusted in 3-D model space as function of time. For example, the 3-D model of the physical object can be rotated in the 3-D model space.

The re-positioning of the 3-D model involves determining a new location of each of the points of the 3-D model in the 3-D model space. Next, textures can be reapplied to the 3-D model. Yet further, a background can be added to the 3-D model space. Then, a light source in the 3-D model space can be simulated. Finally, based upon the light source, the 3-D model and the background can be re-rendered to a 2-D image. This process is repeated each time the 3-D model is changed in the 3-D model space.

The determination of the changes to the 3-D model positions in the 3-D space as a function of time, the re-texturing of the model, the addition of the background and then the re-rendering is computationally expensive, especially as the complexity of the 3-D model increases.

Further, as described above, it requires the generation and storage of a 3-D model and its defining parameters, which is time consuming. Thus, the multi-view interactive digital media representation can be more computationally efficient and require less memory resources than a 3-D model approach.

In addition, when an apparent motion of an object is output from a multi-view interactive digital media representation, it appears as if the object motion is generated from an image quality 3-D textured model. Image quality 3-D textured models are generated in a time consuming and often manual process. In particular, the generation of an image quality textured 3-D model of an object, such as an actual person's face, is notoriously difficult and time consuming, especially, when a "life like" rendering of the object is desired.

In this embodiment of the multi-view interactive digital media representation approach, because of the elimination of the 3-D modeling steps, user-selected objects from user generated 2-D images can be converted quickly to a multi-view interactive digital media representation and then output to a display in real-time. During output, the user can control aspects of apparent motion of the object within the multi-view interactive digital media representation. Because the object in the multi-view interactive digital media representation can be generated from real images, such as images received from a user-controlled camera, the object appears life-like when output. In a traditional 3-D modeling approach, because of the difficulties associated with generating an image quality 3-D model, this capability is not offered.

Returning to FIG. 1, according to various example embodiments, once a multi-view interactive digital media representation 118 is generated, user feedback for acquisition 120 of additional image data can be provided. In particular, if a multi-view interactive digital media representation is determined to need additional views to provide a more accurate model of the content or context, a user may be prompted to provide additional views. Once these additional views are received by the multi-view interactive digital media representation acquisition system 100, these additional views can be processed by the system 100 and incorporated into the multi-view interactive digital media representation.

Figure 2:
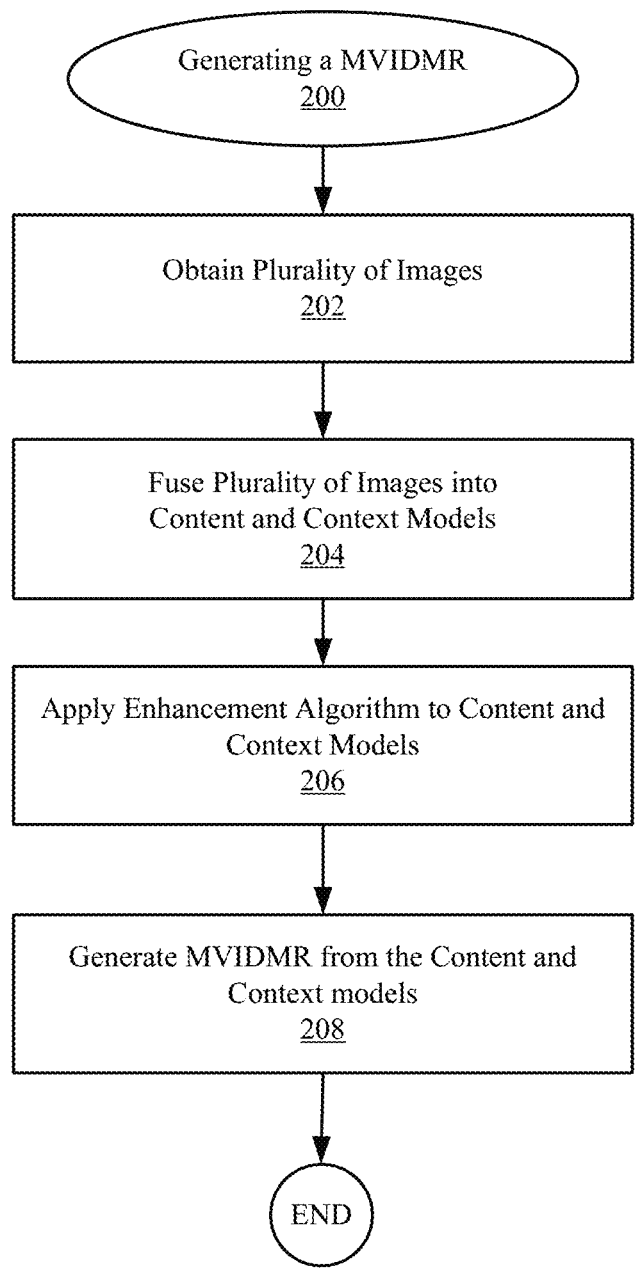
FIG. 2 illustrates an example of a process flow for generating a multi-view interactive digital media representation in accordance with embodiments of the present invention.

With reference to FIG. 2, shown is an example of a process flow diagram for generating a multi-view interactive digital media representation 200. In the present example, a plurality of images is obtained at 202. According to various embodiments, the plurality of images can include two-dimensional (2D) images or data streams. These 2D images can include location information that can be used to generate a multi-view interactive digital media representation. In some embodiments, the plurality of images can include depth images 108, as also described above with regard to FIG. 1. The depth images can also include location information in various examples.

According to various embodiments, the plurality of images obtained at 202 can include a variety of sources and characteristics. For instance, the plurality of images can be obtained from a plurality of users. These images can be a collection of images gathered from the internet from different users of the same event, such as 2D images or video obtained at a concert, etc. In some examples, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In the present example embodiment, the plurality of images is fused into content and context models at 204. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 206. These algorithms can be used to enhance the user experience. For instance, enhancement algorithms such as automatic frame selection, stabilization, view interpolation, filters, and/or compression can be used. In some examples, these enhancement algorithms can be applied to image data during capture of the images. In other examples, these enhancement algorithms can be applied to image data after acquisition of the data.

In the present embodiment, a multi-view interactive digital media representation is generated from the content and context models at 208. The multi-view interactive digital media representation can provide a multi-view interactive digital media representation. In various examples, the multi-view interactive digital media representation can include a three-dimensional model of the content and a two-dimensional model of the context. According to various embodiments, depending on the mode of capture and the viewpoints of the images, the multi-view interactive digital media representation model can include certain characteristics. For instance, some examples of different styles of multi-view interactive digital media representations include a locally concave multi-view interactive digital media representation, a locally convex multi-view interactive digital media representation, and a locally flat multi-view interactive digital media representation. However, it should be noted that multi-view interactive digital media representations can include combinations of views and characteristics, depending on the application.

Figure 3:
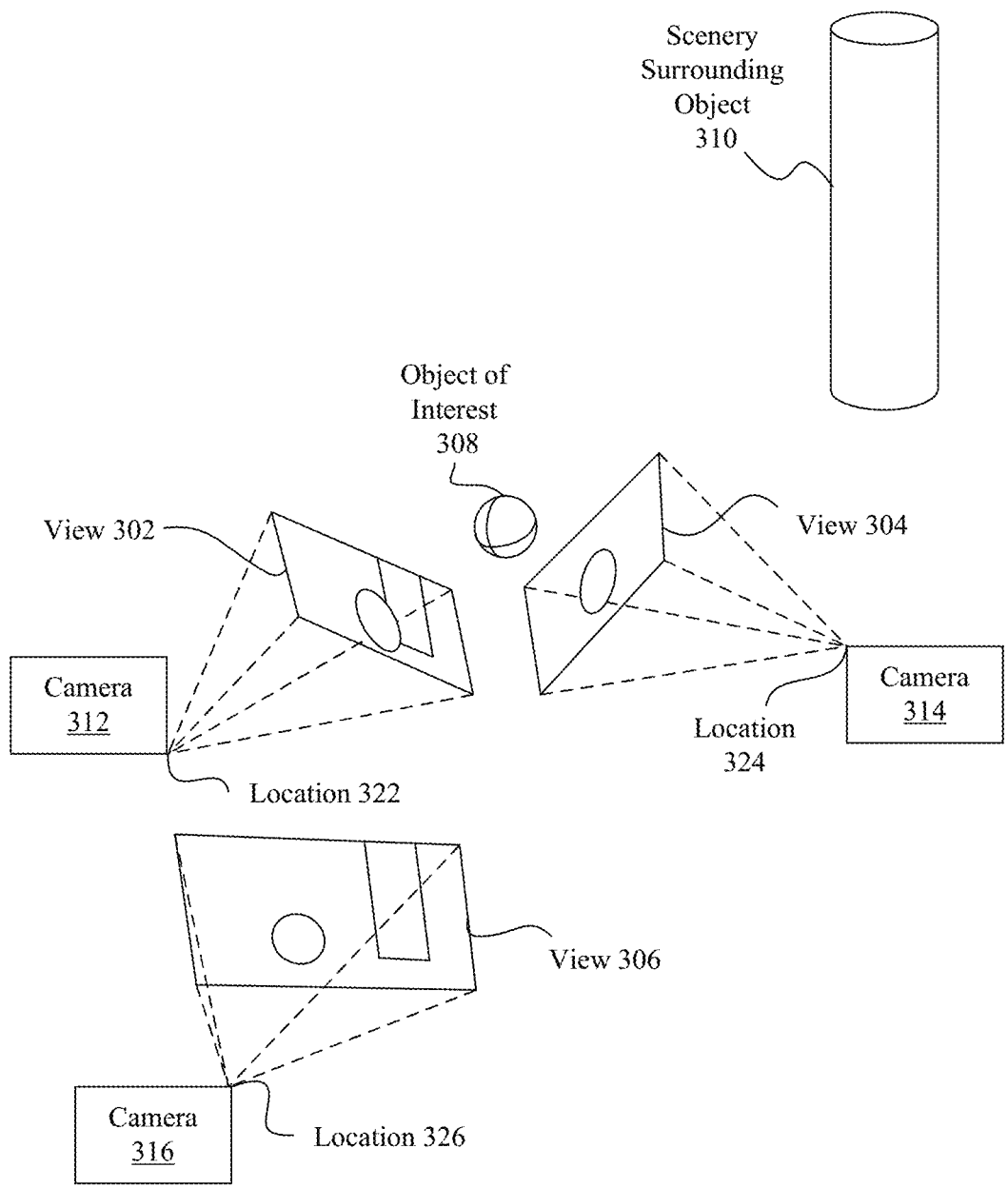
FIG. 3 illustrates one example of multiple camera views that can be fused into a three-dimensional (3D) model to create an immersive experience in accordance with embodiments of the present invention.

With reference to FIG. 3, shown is one example of multiple camera views that can be fused together into a three-dimensional (3D) model to create an immersive experience. According to various embodiments, multiple images can be captured from various viewpoints and fused together to provide a multi-view interactive digital media representation. In the present example embodiment, three cameras 312, 314, and 316 are positioned at locations 322, 324, and 326, respectively, in proximity to an object of interest 308. Scenery can surround the object of interest 308 such as object 310. Views 302, 304, and 306 from their respective cameras 312, 314, and 316 include overlapping subject matter. Specifically, each view 302, 304, and 306 includes the object of interest 308 and varying degrees of visibility of the scenery surrounding the object 310. For instance, view 302 includes a view of the object of interest 308 in front of the cylinder that is part of the scenery surrounding the object 310. View 306 shows the object of interest 308 to one side of the cylinder, and view 304 shows the object of interest without any view of the cylinder.

In the present example embodiment, the various views 302, 304, and 316 along with their associated locations 322, 324, and 326, respectively, provide a rich source of information about object of interest 308 and the surrounding context that can be used to produce a multi-view interactive digital media representation. For instance, when analyzed together, the various views 302, 304, and 326 provide information about different sides of the object of interest and the relationship between the object of interest and the scenery. According to various embodiments, this information can be used to parse out the object of interest 308 into content and the scenery as the context. Furthermore, as also described above with regard to FIGS. 1 and 2, various algorithms can be applied to images produced by these viewpoints to create an immersive, interactive experience when viewing a multi-view interactive digital media representation.

Figure 4:
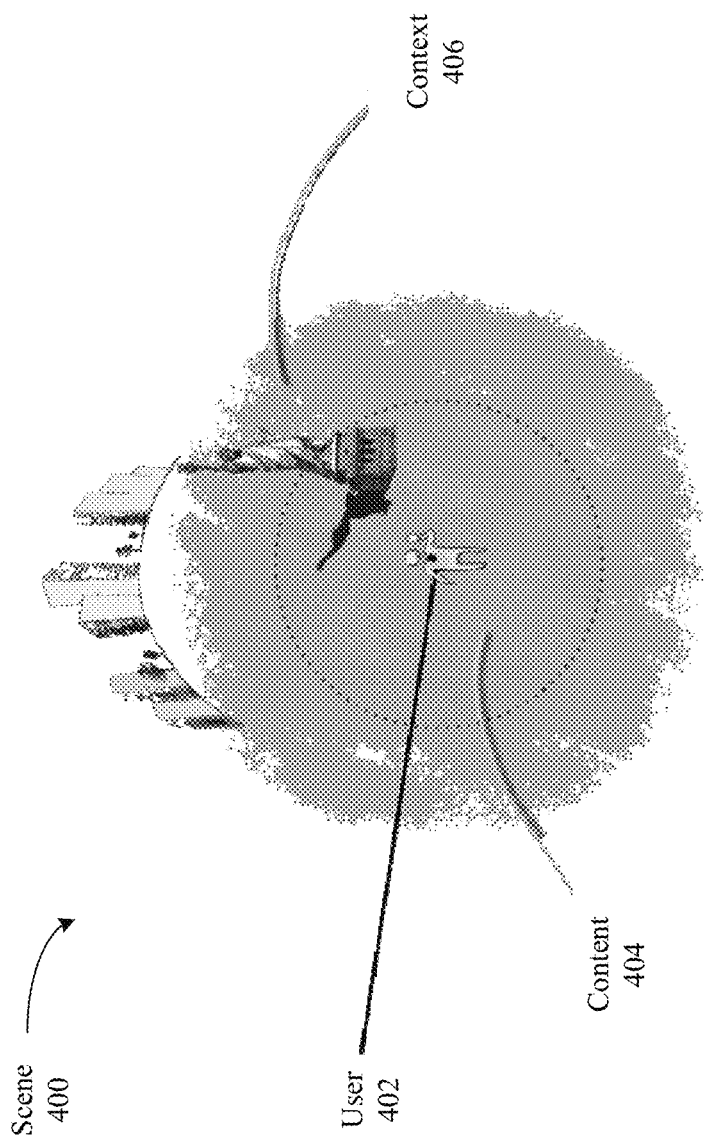
FIG. 4 illustrates one example of separation of content and context in a multi-view interactive digital media representation in accordance with embodiments of the present invention.

FIG. 4 illustrates one example of separation of content and context in a multi-view interactive digital media representation. According to various embodiments of the present invention, a multi-view interactive digital media representation is a multi-view interactive digital media representation of a scene 400. With reference to FIG. 4, shown is a user 402 located in a scene 400. The user 402 is capturing images of an object of interest, such as a statue. The images captured by the user constitute digital visual data that can be used to generate a multi-view interactive digital media representation.

According to various embodiments of the present disclosure, the digital visual data included in a multi-view interactive digital media representation can be, semantically and/or practically, separated into content 404 and context 406. According to particular embodiments, content 404 can include the object(s), person(s), or scene(s) of interest while the context 406 represents the remaining elements of the scene surrounding the content 404. In some examples, a multi-view interactive digital media representation may represent the content 404 as three-dimensional data, and the context 406 as a two-dimensional panoramic background. In other examples, a multi-view interactive digital media representation may represent both the content 404 and context 406 as two-dimensional panoramic scenes. In yet other examples, content 404 and context 406 may include three-dimensional components or aspects. In particular embodiments, the way that the multi-view interactive digital media representation depicts content 404 and context 406 depends on the capture mode used to acquire the images.

In some examples, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 404 and the context 406 may be the same. In these examples, the multi-view interactive digital media representation produced may have some characteristics that are similar to other types of digital media such as panoramas. However, according to various embodiments, multi-view interactive digital media representations include additional features that distinguish them from these existing types of digital media. For instance, a multi-view interactive digital media representation can represent moving data. Additionally, a multi-view interactive digital media representation is not limited to a specific cylindrical, spherical or translational movement. Various motions can be used to capture image data with a camera or other capture device. Furthermore, unlike a stitched panorama, a multi-view interactive digital media representation can display different sides of the same object.

FIGS. 5A-5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a multi-view interactive digital media representation.

With reference to FIG. 5A, shown is one example of a concave view 500 in which a user is standing along a vertical axis 508. In this example, the user is holding a camera, such that camera location 502 does not leave axis 508 during image capture. However, as the user pivots about axis 508, the camera captures a panoramic view of the scene around the user, forming a concave view. In this embodiment, the object of interest 504 and the distant scenery 506 are all viewed similarly because of the way in which the images are captured. In this example, all objects in the concave view appear at infinity, so the content is equal to the context according to this view.

With reference to FIG. 5B, shown is one example of a convex view 520 in which a user changes position when capturing images of an object of interest 524. In this example, the user moves around the object of interest 524, taking pictures from different sides of the object of interest from camera locations 528, 530, and 532. Each of the images obtained includes a view of the object of interest, and a background of the distant scenery 526. In the present example, the object of interest 524 represents the content, and the distant scenery 526 represents the context in this convex view.

FIGS. 6A to 6D illustrate examples of various capture modes for multi-view interactive digital media representations. Although various motions can be used to capture a multi-view interactive digital media representation and are not constrained to any particular type of motion, three general types of motion can be used to capture particular features or views described in conjunction multi-view interactive digital media representations. These three types of motion, respectively, can yield a locally concave multi-view interactive digital media representation, a locally convex multi-view interactive digital media representation, and a locally flat multi-view interactive digital media representation. In some examples, a multi-view interactive digital media representation can include various types of motions within the same multi-view interactive digital media representation.

Figure 6A:
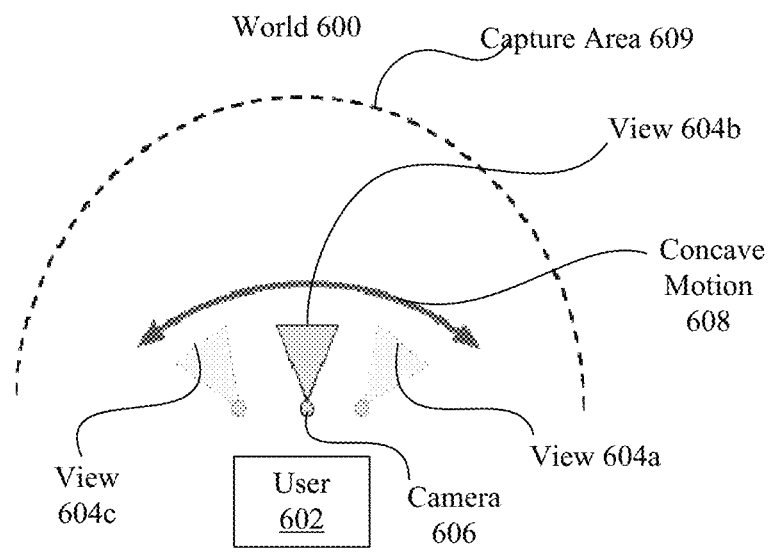
FIGS. 6A to 6D illustrate examples of various capture modes for multi-view interactive digital media representations in accordance with embodiments of the present invention.

With reference to FIG. 6A, shown is an example of a back-facing, concave multi-view interactive digital media representation being captured. According to various embodiments, a locally concave multi-view interactive digital media representation is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In the present example embodiment, a user 602 is using a back-facing camera 606 to capture images towards world 600, and away from user 602. As described in various examples, a back-facing camera refers to a device with a camera that faces away from the user, such as the camera on the back of a smart phone. The camera is moved in a concave motion 608, such that views 604a, 604b, and 604c capture various parts of capture area 609.

Figure 6B:
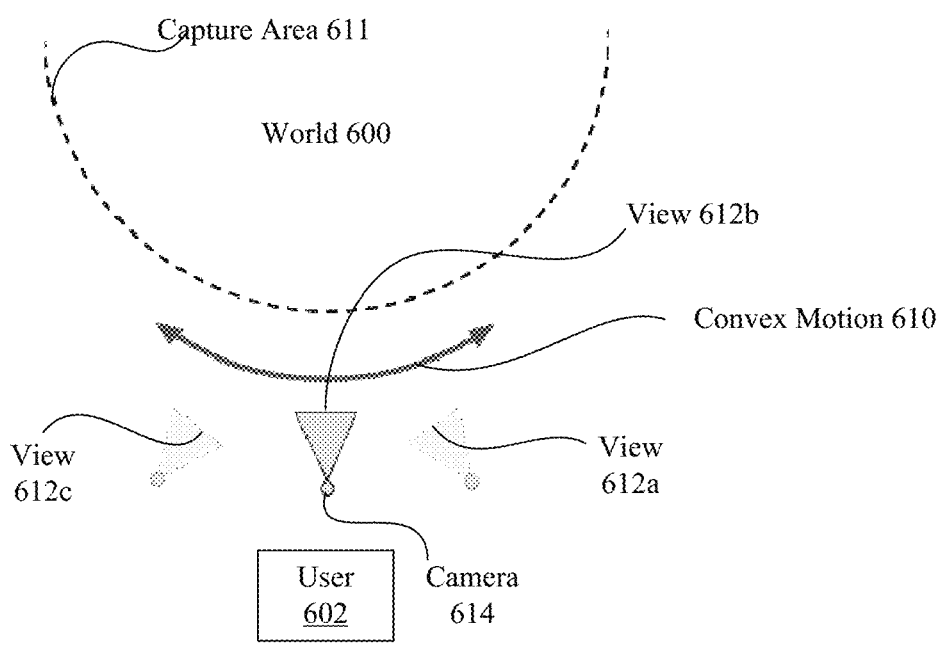

With reference to FIG. 6B, shown is an example of a back-facing, convex multi-view interactive digital media representation being captured. According to various embodiments, a locally convex multi-view interactive digital media representation is one in which viewing angles converge toward a single object of interest. In some examples, a locally convex multi-view interactive digital media representation can provide the experience of orbiting about a point, such that a viewer can see multiple sides of the same object. This object, which may be an "object of interest," can be segmented from the multi-view interactive digital media representation to become the content, and any surrounding data can be segmented to become the context. Previous technologies fail to recognize this type of viewing angle in the media-sharing landscape.

In the present example embodiment, a user 602 is using a back-facing camera 614 to capture images towards world 600, and away from user 602. The camera is moved in a convex motion 610, such that views 612a, 612b, and 612c capture various parts of capture area 611. As described above, world 600 can include an object of interest in some examples, and the convex motion 610 can orbit around this object. Views 612a, 612b, and 612c can include views of different sides of this object in these examples.

Figure 6C:
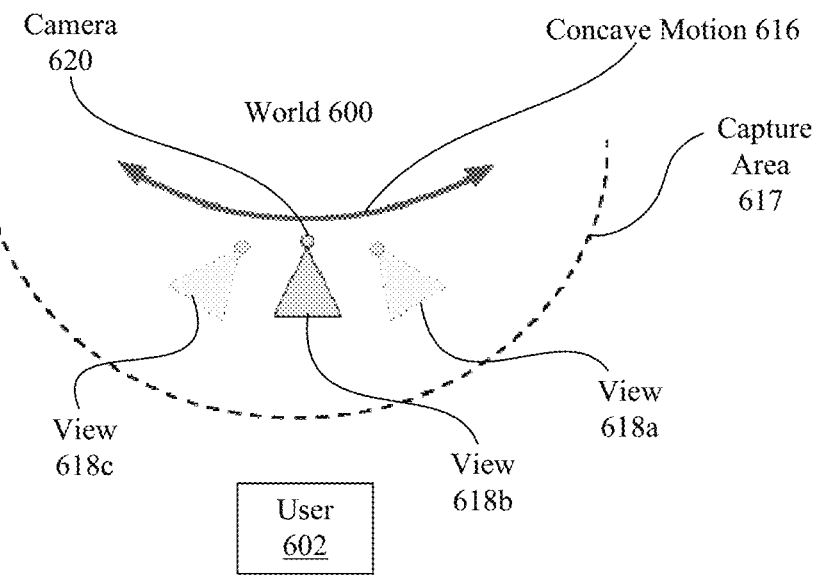

With reference to FIG. 6C, shown is an example of a front-facing, concave multi-view interactive digital media representation being captured. As described in various examples, a front-facing camera refers to a device with a camera that faces towards the user, such as the camera on the front of a smart phone. For instance, front-facing cameras are commonly used to take "selfies" (i.e., self-portraits of the user).

In the present example embodiment, camera 620 is facing user 602. The camera follows a concave motion 606 such that the views 618a, 618b, and 618c diverge from each other in an angular sense. The capture area 617 follows a concave shape that includes the user at a perimeter.

Figure 6D:
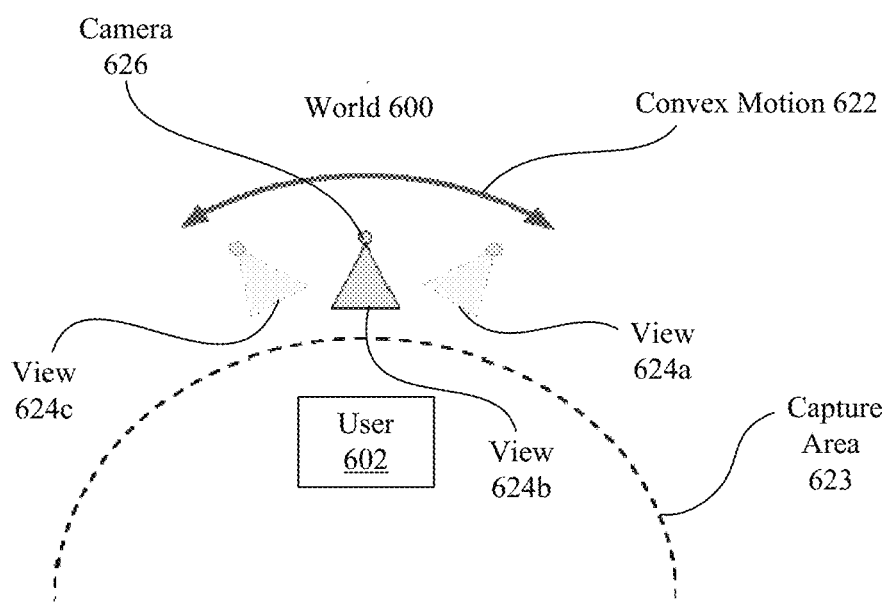

With reference to FIG. 6D, shown is an example of a front-facing, convex multi-view interactive digital media representation being captured. In the present example embodiment, camera 626 is facing user 602. The camera follows a convex motion 622 such that the views 624a, 624b, and 624c converge towards the user 602. As described above, various modes can be used to capture images for a multi-view interactive digital media representation. These modes, including locally concave, locally convex, and locally linear motions, can be used during capture of separate images or during continuous recording of a scene. Such recording can capture a series of images during a single session.

Figure 7:
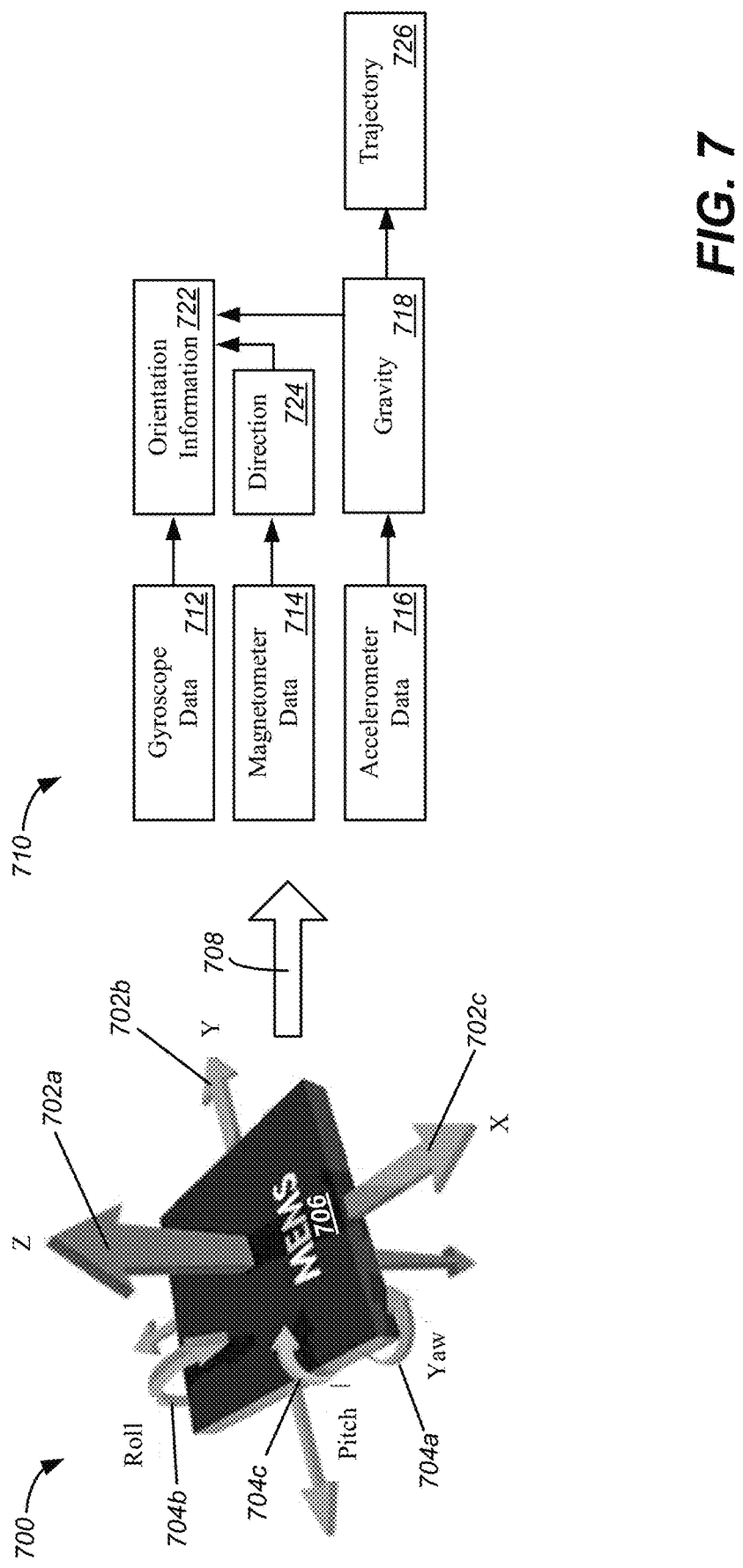
FIG. 7 illustrates a sensor package for determining orientation of a camera used to generate a MVIDMR in accordance with embodiments of the present invention.
Figure 8B:
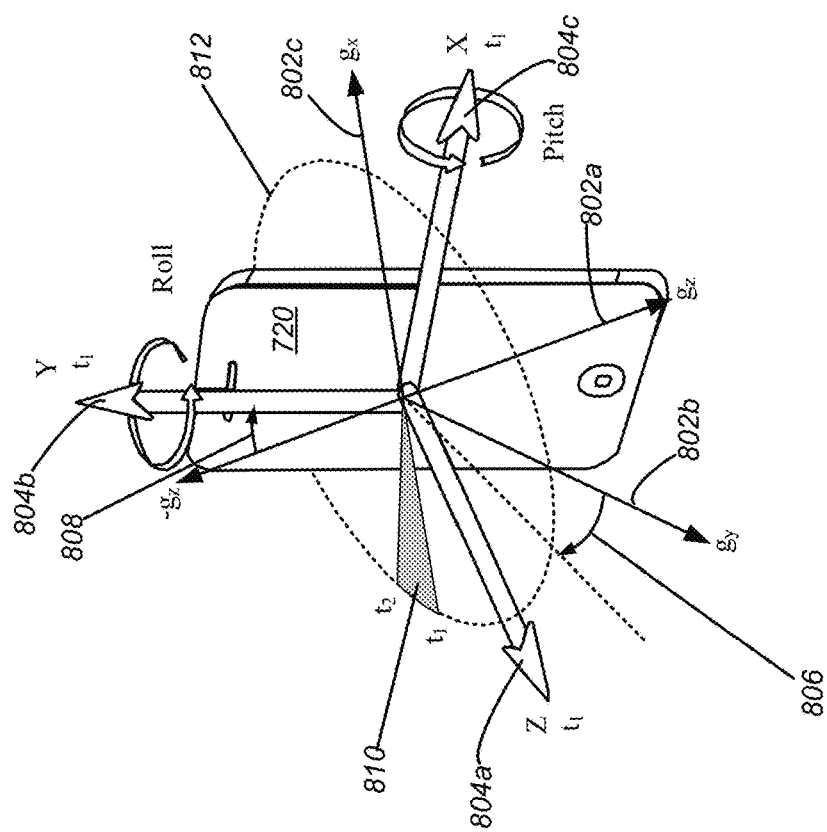
FIG. 8B illustrates pitch and roll of a mobile device and angle changes as a function of time relative to the gravity vector during MVIDMR generation in accordance with embodiments of the present invention.
Figure 8A:
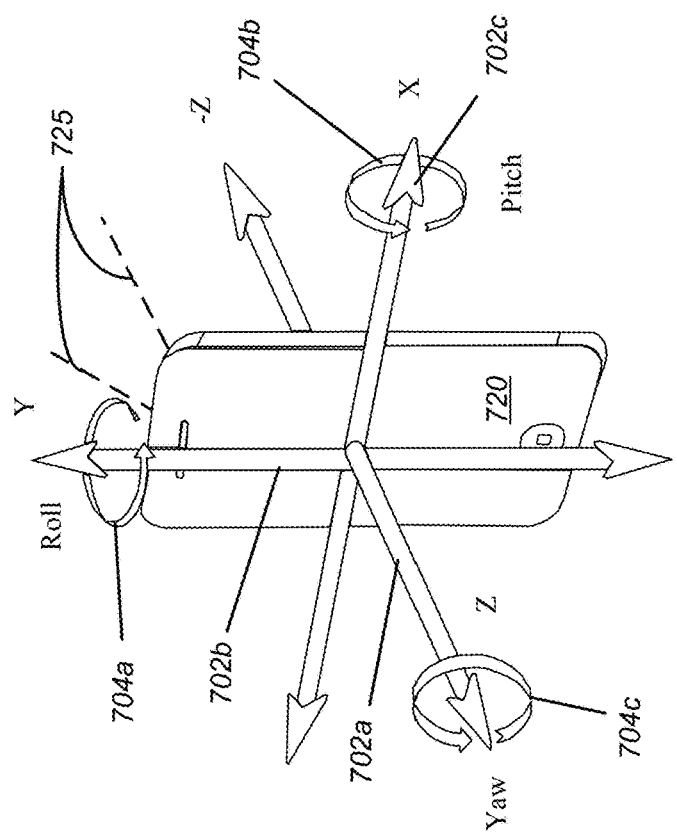
FIG. 8A illustrates a mobile device and body-centric coordinate system in accordance with embodiments of the present invention.

Next, with respect to FIGS. 7, 8A and 8B, a device with a camera and a sensor package is described. As described above, data from a sensor package, such as an IMU can be used to provide image stabilization. Further, data from the sensor package can be used as part of smoothing algorithms used to generate a MVIDMR as described below. Thus, some sensor capabilities and quantities that are derived from the sensors are described as follows.

FIG. 7 illustrates a sensor package 700 for determining orientation of a camera used to generate a MVIDMR. In one embodiment, the sensor package 700 can include a MEMS (Micro-Electro-Mechanical System) device 706. In particular embodiments, the sensor package 700 can be part of an IMU. Other types of sensor packages are possible and the example of a MEMS device 706 is provided for the purposes of illustration only.

The MEMS device 706 can include a plurality of sensors. For example, the MEMS device 706 can include a 3-axis accelerometer. The 3-axis accelerometer can be used to measure accelerations along the z axis 702a, the y axis 702b and the x axis 702c. In addition, the MEMs device can include a 3-axis gyroscope. The 3-axis gyroscope can be used to measure angular velocities, 704a (yaw) about z axis 702a, 704b (roll) about y axis 702b and 704c (pitch) about x axis 702c. In addition, a MEMs device can include an one or more axis magnetometer (not shown), such as 3-axis magnetometer. In various embodiments, a sensor package 700 can include one or more of accelerometers, gyroscopes, magnetometers or combinations thereof.

The sensor package 700 can output sensor data 708. An IMU, which can include a sensor processing system, such as 710, can receive the sensor data 708 and determine an orientation of a device. For example, gyroscopic data 712 can be integrated to determine angular changes about the pitch, roll and yaw axes. Magnetometer data 714 can be used to determine a heading or direction 724 relative to the Earth's magnetic poles. Accelerometer data 716 can be used to determine a direction of the Earth's gravity vector. Further, accelerometer data 716 can be integrated once to determine a velocity of the device and twice to determine distance changes.

The orientation 722 of a device relative to a reference coordinate system can be described with three angles, i.e., pitch, roll and yaw angles. For example, the accelerometer data 716, such as from a 3-axis accelerometer, can provide a pitch and roll orientation of a device relative to the Earth's gravitational vector. The magnetometer data 714, if available, can be used to provide a yaw angle. Gyroscopic data 712 can be used to provide changes to the pitch, roll and yaw angles. Thus, if an initial orientation of a device is known and it begins to rotate, the gyroscopic data can be used to determine an orientation of a device as a function of time.

FIG. 8A illustrates a mobile device 720 with a sensor package, such as the MEMs device 706 shown in FIG. 7. For example, the MEMs device 706 can be installed in device 720 with its axes aligned as depicted in the FIG. 8A. The device 720 can include one or more cameras (not shown) facing in the negative Z direction along axis 702a and one or more cameras facing in the positive Z direction. An exemplary field of view of at least one camera facing in the negative Z direction is indicated by rays 725.

When the fields of view of two or more cameras overlap, knowledge of the distance between the cameras can be used to obtain distance data, i.e., the distance of the camera to objects captured in the image data. For example, the device 720 can include two cameras facing in the negative Z direction with overlapping fields of view. Where the fields of view overlap, the distance to objects from the cameras, and hence device 720, can be estimated based upon a comparison of image data taken from both cameras.

When device 720 is a rigid body, then based upon a position and orientation of the camera relative to the body of device 720, the orientation of the camera can be determined based upon the orientation of body of the device 720. In this example, a camera is aligned with the Z-direction at some position on the face of the body of device 720 facing in the negative Z direction. As described with respect to FIG. 8A, the orientation of a body of the device can be determined from the sensor package. Hence, based upon its position on device 720, the orientation of the camera can be derived from data from the sensor package.

In other examples, a camera can be configured so that it is not aligned with negative Z direction, such as pointing at an angle relative to the negative Z axis. For instance, the device 720 a first camera can be aligned with the negative Z axis and then one or more additional cameras can be configured to point at angles relative to the negative Z direction. The light gathered from the multiple cameras can be combined to provide a wider field of view. In another example, a camera can be designed to mechanically sweep through an angle to provide a wider field of view.

In yet another example, device 720 may not be a rigid body. For example, device 720 can include a flexible housing. When the housing is flexible, sensors may be included which measure an amount of bending. Based upon the amount of bending determined from the sensors and data from a sensor package, such as a sensor package on an IMU, an orientation of the camera on a flexible body can be determined.

Next, examples are considered where the device 720 is allowed to move generally in 3-D space. FIG. 8B illustrates pitch and roll of a mobile device 720 and angle changes as a function of time relative to the gravity vector during image acquisition for MVIDMR generation. The direction of the gravity vector is indicated by 802a. An orthogonal coordinate system associated with the gravity vector is indicated by 802b and 802c.

The direction of the body centered coordinate system for device 720 is indicated by 804a, 804b and 804c. The direction of the camera is in the negative Z direction as in the previous pictures. The pitch and roll orientation of the device 720 relative to the gravity vector can be determined using sensor data from the 3-axis accelerometer. As described above, if a magnetometer data is available, then it may be possible to obtain yaw data.

The gyroscopic data can be used to determine a roll rate of the device 720 about axis 804b and the pitch rate about 804c. The roll rate can be integrated to obtain an amount of roll between a first time and a second. The pitch rate can be integrated to obtain an amount of pitch between a first time and a second time.

In one embodiment, the angular rotation amount of device 720 during an MVIDMR image acquisition can be determined using just the roll rate or pitch rate. If the device is orientated in a portrait mode and the user plans to pan around an object with this orientation, then the roll rate from the gyroscopic data as a function of time can be integrated to determine a total roll angle amount as a function of time. In one embodiment, negative roll rates can be ignored for the purposes of determining the total roll angle amount. The total roll angle amount as a function of time can be used to estimate the angular view of an object that has been captured during image acquisition.

If the device 720 is orientated in a landscape mode and the user plans to pan around an object with the device in this orientation, then the pitch rate from the gyroscopic data as a function of time can be integrated to determine a total pitch angle as a function of time. In this example, negative pitch rates can be ignored for the purposes of determining the total pitch angle amount. The total pitch angle amount as a function of time can be used to estimate the angular view of an object that has been captured during the image acquisition process.

In one embodiment, the MVIDMR system can present a user with a selection of a type of path for the device to follow and an orientation of the device that is to be used during the path. Based upon the input provided by the user, the MVIDMR system can determine whether to determine the total pitch angle amount or the total roll angle amount for the purposes of determining an angular view amount of an object that has been captured as a function of time. In these embodiments, as roll rate data and pitch rate data is being integrated, the orientation of the device as a function time may not be needed. However, a starting time to begin the integration of the roll rate data or the pitch rate data and an ending time may have to be determined. In one embodiment, the start and stop can be determined based upon a user selecting a button in an input interface, i.e., the user can select a button to start the image capture and end the image capture.

In another embodiment, the sensor data from the 3-axis accelerometer can be used. The 3-axis accelerometer can be used to determine a roll and pitch orientation of the device 720 relative to the gravity vector (gx, gy and gz) as a function time. For example, in FIG. 8B, the device is pitched by angle 808 about the gx axis 802c and rolled about the gravity vector gz 802a by an angle amount 806 at time $t_1$. The yaw angle amount about the gy axis 802b is not determined using the 3-axis accelerometer data. As described above, it can be set to an arbitrary value such as zero degrees.

At $t_1$, the first value of angles 806 and 808 provide an orientation of the Z axis 804a (or negative Z axis) in the coordinate system associated with the gravity vector (802a, 802b and 802c). As described above, a camera on device 720 can be orientated in the negative z direction. At $t_2$, the magnitude of the value of the pitch angle 808 can increase or decrease relative to its value at $t_1$ and the magnitude of the value of the roll angle 806 can increase or decrease relative to its value at $t_1$. The values of the pitch angle 808 and roll angle 806 at time $t_2$ again determine the orientation of the negative z vector in the coordinate system associated with the gravity vector.

In one embodiment, at different times, such as between $t_1$ and $t_2$, an angle value can be determined between the 3-D camera direction vectors, which is the negative z direction in the camera based coordinate system. In this example, the 3-D camera direction vector at each time can be determined in the gravity based coordinate system (802a, 802b and 802c) using the pitch and roll angles about the gx 802c and gz 802a axes obtained from the accelerometer data. The yaw angle about the gy 802b vector can be set to zero or some other fixed value (no yaw change as a function of time). With pitch, roll and yaw angles in the gravity based coordinate system for 3-D camera vector known as a function of time, the change in the angle between the 3-D camera direction vector at two different times, such as between times, $t_1$ and $t_2$, can be determined.

The angle changes can be summed to determine a total angle change as a function of time. The angle change is approximately around the gravity vector gz 802a. The total change in angle can be used to estimate an angular view of an object captured by the camera. Thus, the angular view of the object captured as function of time can be determined and output to a display screen. Like the examples described above, a rotation direction that is needed along the path to keep the object in view of the camera can be determined, i.e., clockwise or counter clockwise. Further, angle changes, in the direction that is not needed, can be ignored for the purposes of determining the angular rotation amount in the rotation direction that is needed to keep the object in view of the camera.

In another embodiment, the angle changes can be projected into a particular plane. For example, a circle 812 is shown in a plane perpendicular to the gravity vector. The 3-D camera direction vector can be projected into this plane. Then, the angle changes of the 3-D camera direction vector projected into this plane from time to time can be determined, such as 810. Like the examples described above, a rotation direction that is needed along the path to keep the object in view of the camera can be determined, i.e., clockwise or counter clockwise. Further, as described above, angle changes in the plane in the direction that is not needed can be ignored. Additional details of determining an angular view of an object captured using camera sensor data is described in co-pending U.S. patent application Ser. No. 15/601,893, entitled "Loop Closure," filed May 22 2017, which is incorporated herein in its entirety and for all purposes.

Next, with respect to FIGS. 9-12, some examples of trajectory smoothing are described. In trajectory smoothing, first image data received from a camera that traveled a first trajectory can be manipulated to generate a second image data. The manipulations resulting in the second image data can be selected so that it appears as if the camera travelled a "smoother" trajectory. The trajectory smoothing can involve reducing effects related to, but not limited to, the camera position moving up and down, left and right, rotating or moving, closer and father away from an object along a trajectory.

When live images of multiple views of an object are captured using a hand-held camera, the camera motions can be non-smooth as the person tries to keep the object centered in the image and about the same size in the image as they move the camera around the object. The camera motions including the position of the camera and angular orientation of the camera at each point along its trajectory where an image is captured. When the live images captured in this manner are used to generate an MVIDMR of the object, the motion of the object during playback can reflect some of these non-smooth motions. For example, during playback motion, the object can appear to jigger up and down, rotate back and forth or get bigger and smaller. The magnitude of these effects can increase the greater the unsteadiness in the camera motion during the live image capture.

To reduce these non-smooth motions during MVIDMR playback, a transformation operation can be performed on each of the live images selected to generate an MVIDMR of the object. For the purpose of simplicity such transformation operations are generally described herein as translation, rotation and/or scaling operations; however one having skill in the art can appreciate that such transformation operations can include other suitable transformations such as homographies. The translation, rotation and/or scaling operations can be selected so that it appears as if the image data is captured along a smoother trajectory as compared to the original trajectory. In particular, each of the live images can be manipulated with a translation, rotation and/or scaling operation such that changes from image to image in translational position, rotational position and size of an object within the images are reduced as compared to the original live images.

The effect of these operations on an object in the images can correspond to the camera travelling along a new trajectory with a new position and new angular orientation that is different than original trajectory. The reduction in changes in translational position, rotational position and size of the object from image to image after image manipulation can be referred to as "smoothing." Hence, the new trajectory and angular orientation of a camera that correspond to these new images can be referred to as a smoothed trajectory. Hence, manipulating images from a live image series such that changes from image to image in translational position, rotational position and size of an object within the images are reduced as compared to the original live images can be referred to as trajectory smoothing.

The new image data, associated with the "smoothed" trajectory, can be used to generate an MVIDMR of an object. When the MVIDMR of the object is played back by a user, the playback of the object, such as the object's motion, can appear smoother than when the MVIDMR is generated using the first image data. Further details of the trajectory smoothing are described as follows.

FIG. 9 illustrates an actual 918 and smoothed camera trajectory 918 during image capture 900 for MVIDMR generation. In FIG. 9, an object, which is a shoe 920, is shown sitting on a table 912. An axis 908, which is aligned with the gravity vector, is shown drawn perpendicular through the table 912.

A hand-held device 902, which includes a camera, a display 906, processor, memory, a sensor package and other components, is shown. The hand-held device can be used to capture image data of the shoe 920 to generate an MVIDMR. Additional details of devices which can be utilized to capture image data are described below with respect to FIG. 14.

In this example, a single front-facing camera is used. A line 916 is drawn from the front facing camera to the shoe 920. The line 916 can be the optical axis of the camera. The optical axis can go through the center of the image which captured. The lines 914 can represent a field of view of the camera. An image 904 of the shoe 920 within the field of view 914 is shown output to the display 906.

As described above, the device 902 can include a sensor package, such as an IMU. The IMU can be used to determine a rotation orientation of the device 902 about the optical axis 916. As will be described in more detail below, the rotation orientation data from the IMU can used to develop a constraint used in the trajectory smoothing.

In one embodiment, multiple front facing cameras can be used to capture image data of the shoe 920 from different viewpoints. The image data from multiple viewpoints can be used to determine a distance of the device 902 to the shoe 920. In yet other embodiments, a depth sensor can be used to determine a distance from the device 902 the shoe 920. The distance of the device 902 to the shoe 920, including different points on the object, can be used as a constraint in the trajectory smoothing.

To generate an MVIDMR with playback capabilities showing rotational motion of the shoe 920 about axis 908, the camera on device 902 may be moved along a trajectory around the axis 908 while image data is captured. The amount of rotation of the device 902 about the axis 908 during image capture can determine how much an MVIDMR of the object rotates during playback. For example, if the camera is moved one-hundred eighty degrees around axis 908, then an MVIDMR with up to one hundred eighty degrees rotational motion can be generated. If the camera is moved three hundred sixty degrees, then an MVIDR with up to three hundred sixty degrees rotational motion can be generated.

Many possible camera trajectories are possible during image capture. Typically, desired trajectories are ones where the image data captured along the trajectory can be used to generate an MVIDMR with smooth motion during playback. Smooth motion during playback can be related to a "smoothness" of the trajectory, i.e., a trajectory where the camera is moved is moved with a steady and smooth motion.

An example "desired" trajectory for the image data capture used in the MVIDMR generation may involve moving the camera at a steady velocity around axis 908 while maintaining a fixed distance between axis 908 and the camera on device 902. Further, along the "desired" trajectory, the camera may be kept in a plane parallel to the table 912. Yet further, the camera may be rotated as it moves to keep the shoe 920 centered on the display 906. Trajectory 918, illustrated by the dotted lines, can represent this "desired" trajectory with the properties described above.

In actuality, the camera can be hand-held and the camera motion can be unsteady at times. As a result, the camera on device 902 can follow trajectory 910. Along trajectory 910, the camera on the device 902 can move closer and farther away from the shoe 920, move in and out of plane, such that shoe 920 appears bigger and smaller on the display and may rotate in a manner that the shoe 920 is not kept centered on display. When an MVIDMR is generated from image data captured along trajectory 910, the motion of the MVIDMR during playback can be less smooth than if the MVIDMR was generated from image data captured along the "desired" trajectory 918 described in the previous paragraph.

To obtain a smoother playback of the MVIDMR data, the image data captured along trajectory 910, which can consist of pixel values arranged in array for each image, can be manipulated in some manner. For example, image data for each of the images captured can be translated, rotated and/or scaled. After the manipulations, the image data can appear as if it were captured via a camera which travelled along a smoother, such as trajectory 922, in FIG. 9.

In forming trajectory 922, some of the jaggedness in trajectory 910 has been smoothed out. Further, trajectory 922 is closer to the "desired" trajectory 918. Hence, when the manipulated image data associated with smoothed trajectory 922 is used to generate an MVIDMR, the motion of the shoe 920 during the playback of the MVIDMR can appear smoother than if the MVIDMR were generated from the original image data captured along trajectory 910. Some additional details of the image manipulations that can result in a smoother trajectory are described as follows with respect to FIGS. 10A and 10B.

In FIG. 10A, a first set of images 1000 are received from a camera. The first set of images includes thirteen images 1002a, 1002b, 1002c, 1002d, 1002e, 1002f, 1002g, 1002h, 1002i, 1002j, 1002k, 10021 and 1002m taken in a portrait mode. The images are taken around shoe 920 in FIG. 9 at different angles and include a three hundred sixty degree view of the shoe 920. In particular, views of the shoe from different angles, 1004a, 1004b, 1004c, 1004d, 1004e, 1004f, 1004g, 1004h, 1004i, 1004j, 1004k, 10041 and 1004m, are shown where view 1004a of the shoe 920 is approximately at zero degrees and view 1004m is approximately at three hundred sixty degrees. As an example, the images 1002a-1002m can be taken along trajectory 910 shown in FIG. 9.

The first set of images 1000 can be considered an ordered set because a relationship is known between images. For example, image 1002a was captured first followed by image 1002b, then by image 1002c. As described below, this relationship can be used when comparing images, such as for the purposes of matching key points and/or features in the images. For example, in some embodiments, only images, which are adjacent to one another in the series of images, can be compared to one another.

In one embodiment, the first set of images 1000 can be pre-screened prior to use for generating an MVIDMR. In particular, the changes in position of the object, the shoe, in the images can be checked. For example, a position of the shoe, such as from left to right or up and down, from image to image can be checked. As another example, the changes in rotation of the shoe, such as a change in an amount of angular rotation from image to image can be checked. In yet another example, a size variation of the shoe, from image to image can be checked. In one embodiment, when changes between the images are determined to be too large, an image set can be rejected for smoothing and/or MVIDMR generation.

In one embodiment, for the purposes of determining the changes in translation, rotation or scaling, only adjacent images in the series are compared. For example, only changes between images 1002a and 1002b or 1002g and 1002h can be determined and compared to a threshold value. In another embodiment, changes between images of greater distance in the series 1000 can be computed and compared to a threshold value, such as between 1002e and 1002g or 1002h and 1002j. When a threshold value is exceeded, the whole image series can be rejected for the purposes of generating an MVIDMR. Thus, this type of screening can be considered pre-smoothing in the sense that camera trajectories with too much variation between images are rejected.

In one embodiment, the changes between images can be characterized using feature detection and matching, such as key point matching between the images. As will be described in more detail below with respect to FIG. 11, key point matching can also be used for trajectory smoothing. In key point matching, key points can be identified in one image and then corresponding points can be located in a related image. When the points are matched between images, their locations in each image can be used to determine translation, rotation and/or scale differences between the two images. For example, a pixel distance can be determined between a key points found in two images based upon the location of the key point in each image. The pixel distance can be used to characterize the changes between images, i.e., the key point moved some amount from image to image, as a result of the camera motion.

Key point detection and matching can occur in a number of separate stages. During a feature detection (extraction) stage each image is searched for locations (key points) that are likely to match well in other images. The search can involve looking at the pixel data associated with each pixel and then pixels and their associated data surrounding the selected pixel to identify changes, such as large gradients in the pixel data. During a feature description stage, each region around detected key point locations can be converted into a more compact and stable (invariant) descriptor that can be matched against other descriptors. In a feature matching stage, searches for likely matching candidates in other images can be performed, such as between two adjacent images in the image series. In one embodiment, only searches in a small neighborhood around each detected feature can be performed.

As described above, the first series of images can be an ordered set in that the order in which the images were captured is known. Thus, in one embodiment, searches for key point matching can occur only between adjacent images in the series. For example, key point matching can occur between image 1002a and 1002b or between 1002b and 1002c, but, not between images 1002a and 1002c. This approach can use less computational resources than allowing for more generally matching between images.

In one embodiment, the key point matching can be used to determine how much each image overlaps from one image to the next in the series. For example, after image 1002a was taken, the camera can be moved very quickly such that the opposite side of the shoe 1004a can be captured. In this instance, there may not be any key point matches between the shoe 1004a in image 1002a and a second image showing the opposite side of the shoe 1004a. When there are no key point matches, the overlap between the images can be determined to be zero. Hence, it can be determined that the two images should not be included sequentially in a series.

In another example, the camera can only be shifted slightly after image 1002a is captured. In this instance, the next image captured can significantly overlap image 1002a when the number of key point matches between the images are determined. Hence, a series of images including these two images would not be rejected because of a lack of overlap between these two images.

In general, the key point overlap can include determining how many key points determined in a first image can be matched to a key points in a second image. In one embodiment, when the overlap is determined to be less than the threshold value between any of the adjacent images in the series, the image series can be rejected. A thresh hold value can be some percentage. For example, a threshold value can be that 50% of the key points need to be matched between of the adjacent images in an image series. In one embodiment, the overlap threshold can be set between forty and ninety percent.

In another embodiment, sensor data from a device including the camera can be used as a prescreening method for series 1000, i.e., prior to it being converted to an MVIDMR. For example, an orientation of the camera can be determined for each image. If the change in orientation is too abrupt between the images then the series can be rejected.

As described above, an angle change can be determined between two images. If the angle change between two images is greater than some threshold value, then the image series, such as series 1000, then the image series can be rejected. In other example, linear acceleration can be associated with each image. When the linear acceleration is above a threshold value, then the series can be rejected.

Returning to FIG. 10A, lines 1006 and 1008 are drawn through each of the images 1002a-1002m for reference. It can be seen that objects in each image are shifted up and down relative to the lines, which can represent translations up or down in the camera above or below some reference plane of motion. For example, shoe 1004b is shifted up and boot 1004e is shifted down relative to lines 1006 and 1008.

Further, the shoes vary in size from image to image. The size variation can represent the distance of the camera from the shoe changing from image to image where a larger shoe corresponds to the camera being closer to the shoe. For example, shoe 1004a fits just between the lines 1006 and 1008. However, shoes 1004c and 1004j are much greater than the space between the lines 1006 and 1008 whereas shoe 1004g is much smaller. Finally, some shoes are rotated relative to the lines, which can represent rotations of the camera around its optical axis. For example, shoe 1004f is shown rotated clockwise in the image 1002f wherein shoe 1004c is shown rotated counter-clockwise.

In FIG. 10B, a second series of images 1020 including thirteen images, 1012a, 1012b, 1012c, 1012d, 1012e, 1012f, 1012g, 1012h, 1012i, 1012j, 1012k, 1012l and 1012m is shown. Series 1020 is formed from the images in series 1000. A transformation is determined for each of the images in series 1000 that leads to the images in series 1020. For example, image 1002a is transformed to image 1012a, image 1002b is transformed to image 1012b. This proceeds up to image 1002m, where image 1002m is transformed to image 1012m. Additional details of the determination of the image transformations are described with respect to FIGS. 11, 12 and 13.

For reference, the size and position of the original image in series 1000 is repeated in FIG. 10B as rectangles 1010a, 1010b, 1010c, 1010d, 1010e, 1010f, 1010g, 1010h, 1010i, 1010j, 1010k, 1010l and 1010m, respectively. The size of the original image is referred as an image "frame." Also, a size and position of a transformed image associated with series 1020 is shown.

As part of the transformation, the shoe in each image has been centered in the image. Further, the images have been scaled up or down so that the shoe is approximately the same size in each image. In addition, the shoes have been rotated if needed so that each shoe is approximately vertically aligned. The transformations to each image are described as follows.

Image 1012a retains its size and position as compared to image 1002a. Image 1012b has been scaled downward, shifted down and slightly to the left relative to frame 1010b. Image 1012c is shown to be scaled down and rotated counter-clockwise relative to frame 1010c. Image 1012d is shifted up and to the right relative and scaled down relative to frame 1010d. Image 1010e is rotated right, shifted up and to the left and scaled down relative to frame 1010e.

Continuing in series 1020, image 1012f is rotated right and shifted down relative to frame 1010f. Image 1012g is scaled up and slightly shifted to the right relative to frame 1010g. Image 1012h is rotated clockwise and slightly shifted down relative to frame 1010h. Image 1012i is scaled down and shifted left relative to frame 1010i. Images 1012j and 1012k are scaled down and shifted down relative to frames 1010j and 1010k. Image 1012l is scaled down relative frame 1010. Finally, image 1012m is rotated counter-clockwise relative to frame 1012m.

In FIGS. 10A and 10B, the aspect ratio of the original images is held constant during the translation, rotation and scaling transforms. This type of transformation can be referred to as a similarity two transform. In other embodiments (not shown), the aspect ratio of the image can be changed during the transformation. This type of transformation can be referred to as an affine transformation.

After the transformations of the images, as shown in series 1020, the images are centered relative to one another, are aligned in a similar direction and are all about the same height. Thus, an MVIDMR with a smooth playback motion can be generated from the boots shown in the series of images 1020. However, due to the translation, rotation and scaling operations, the images vary in size and orientation from image to image.

In addition, some of the images in series are smaller than original image. For example, images, such as 1012b, 1012c, 1012d, 1012j, 1012k and 1012l are smaller than the original image size as exemplified by frame 1010a. Whereas, images 1012e, 1012f, 1012g, 1012h, 1012i and 1012m, each include a portion that extends beyond the original frame size as exemplified by frame 1010a.

These issues can be considered as part of the MVIDMR generation process. First, a common image size can be selected, such as the original frame size exemplified by frames 1010a-1010m. Another image frame size can also be selected, such as a common image size with a similar aspect ratio to frame 1010a, but smaller. In addition, a common image frame size with a different orientation can be selected, such as frame 1010a rotated ninety degrees to provide a landscape mode, but, with the aspect ratio preserved to avoid stretching the images.

Once a common image size is selected, all or a portion of each image in series 1020 can be utilized. For example, frame 1010a can be selected as the common image size all of image 1012a can be used since it fills frame 1010a. Further, all of image 1012b can also be used. However, because of scaling, image 1012b doesn't fill the entire frame 1010b. Rather than leaving this portion blank or filled in with some color, such as black, the unfilled region can be filled in some manner as described below.

In one embodiment, it may be possible to extract the object in the images from the background and then superimpose it on a new background. For example, the background around shoe in image 1012a may be extracted. Then, the shoes from each of the remaining images 1012b-1012m can be extracted and superimposed on this background image. This process is described above with respect to FIGS. 1-6D. Thus, the area around the shoe in image 1012b can be filled in with the background data from image 1012a to fill out the selected common image size 1010b.

In another embodiment, the area surrounding image 1012b, between the image frame 1010b and image 1012b, can be filled in by mirroring portions of the image in 1012b. In yet another embodiment, a portion of another image can be used to fill in this space. For example, a portion of the background from image 1012a can be used to fill in the area between image 1012b and the image frame 1010b. In some implementation, cropping can be a factor involved in the performance of stabilization. By way of example, stabilization may be performed in a manner that minimizes the requirement for cropping and/or the filling in of information.

As described above, a smaller common image size can be selected other than the size of the original image. For example, a common image frame size 1014a can be selected which is smaller than original image frame size 1010a. As shown in FIG. 10B, image 1012a extends outsides the bounds of the common image frame size 1014a. Thus, image 1012a can be cropped to fit inside of the common image frame 1014a.

The common image size 1014a can also be used for image 1012b and the remaining images in the series in 1020. Using common image size 1014a, a portion of the image 1012b also extends outside of the frame 1014a. Thus, image 1012b can be cropped where it extends outside of frame 1014a. Near the top of image 1012b and frame 1014a, there is a small area of non-overlap can be filled in. However, this area is smaller than the area between the original frame size 1010b and image 1012b. Thus, a smaller common image size can be used to reduce the amount of background around an image which is filled in when the transformed image is smaller than the common image size.

Images 1012e, 1012f, 1012h and 1012m are rotated and extend beyond the original image frame size, i.e., 1010a-1010m. The original frame size, such as 1010a, can be used as the common image size for the transformed images in series 1020. Thus, the portions of images 1012e, 1012f, 1012f and 1012m that extend beyond the original frame size can be cropped.

After cropping, there are angled portions of the common image frame size that no longer include an image. For example, image 1012f can be cropped using common image frame size 1010f. In the bottom left corner a triangle 1016 is formed between image 1012f and the common image frame size 1010f. The triangle can be filled in with a background accounting for the shape and its location.

As another example, shape 1010*i* can be used as a common image frame size and used to crop image 1012*i*. Thus, a shape is left with a top portion which extends above image 1012*i*, a portion to the right that extends downwards and a portion that extends beneath image 1012*i*. Again, this shape 1018 can be filled with an appropriate background. For example, portions of images 1012*i* can be mirrored to fill in the shape 1018 or portions of a background can be borrowed from another image, such as but not limited to an adjacent image in the series.

Figure 11:
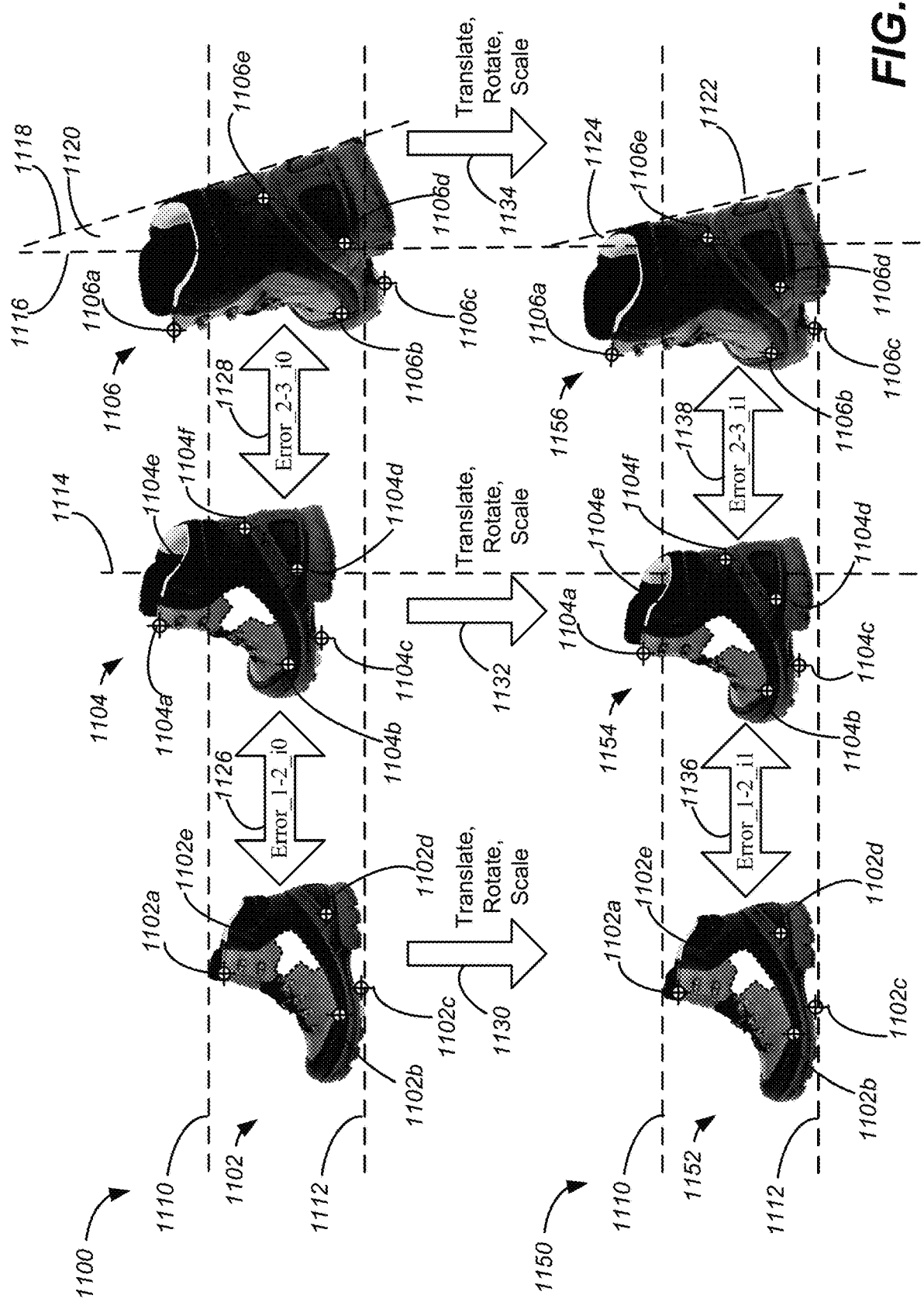
FIG. 11 illustrates examples of determining error constraints associated with camera trajectory smoothing in accordance with embodiments of the present invention.

Next, with respect to FIGS. 11 and 12 methods of transforming images arranged in a series to provide a smoother trajectory are described. FIG. 11 illustrates examples 1100 and 1150 that involve determining error constraints. The error constraints can be used to guide image transformations that smooth a camera trajectory.

In a first example 1100, three images of a shoe 1102, 1104 and 1106 are shown. A number of reference lines are provided including 1110, 1112, 1114, 1116, 1118 and 1124 to help illustrate changes in position between orientations of the shoe shown in example 1100 and the shoe shown in example 1150. For example, lines 1110 and 1112 help to illustrate vertical changes in position, line 1114 helps to illustrate a horizontal change in position and lines 1116, 1118 and 1124 help to illustrate angular rotation changes, such as a rotation from angle 1120 to 1124.

The images can be consecutive images in an image series. For shoe 1102, a number of key points, 1102*a*, 1102*b*, 1102*c* and 1102*d* can be determined. More or less key points can be determined and four is provided for the purpose of illustration only. In addition, a feature 1102*d*, which is an area on shoe 1102 can be identified.

For shoe 1104, key points 1104*a*, 1104*b*, 1104*c*, 1104*d*, 1104*f* can be determined. Further, key feature 1104, which is an area of the shoe, can be provided. For shoe, 1106, key points 1106*a*, 1106*b*, 1106*c*, 1106*d* and 1106*e* can be determined. No features are determined for shoe 1106. In various embodiments, only key points can be used. In other embodiment, a combination of key points and features can be used.

Next, the correspondence between key points and features (if available) can be determined between images. In one embodiment, the correspondence can be determined between only adjacent images in an image series, such as between shoe 1102 and shoe 1104 or between shoe 1104 and 1106. In other embodiments, the correspondence can be determined beyond adjacent images, such as between shoe 1102 and shoe 1106.

In more detail, between shoe 1102 and shoe 1104, key point 1102*a* is matched to key point 1104*a*, key point 1102*b* is matched to 1104*b*, key point 1102*c* is matched to 1104*c* and key point 1102*d* is matched to key point 1102*d*. Feature 1102*e* is matched to feature 1104*e*. Finally, shoe 1104 includes key point. There is no corresponding key point to key point 1104*f* on shoe 1102.

As described above, in one embodiment, the amount of key point matches between images can be used to determine an amount of overlap between the images. Between images of the shoe 1102 and 1104, four out of five key points match. Thus, the overlap between the images can be determined to be eighty percent.

Next, an error can be determined between the images. For example, one of the key points can be selected such as 1102*b* in image of shoe 1102 and then key point 1104*b* can be aligned such that the distance between these two key points is zero. Then, pixel distances can be determined between 1102*b* and 1104*b*, 1102*c* and 1104*c* and 1102*d* and 1104*d*. In another example, the images can be interposed over one another, such as by matching the corner, and then the pixel distances can be determined.

The pixel distances can be summed to provide a first error, as error 1126, which is the error between images one and two in the series at the initial iteration. If desired, the area overlap between area 1102*e* and 1104*e* can be determined. The amount of area overlap can be used as a second error term (not shown).

Next, a similar operation can be carried out between shoe 1104 and 1106. In particular, key point 1104*a* can be mapped to key point 1106*a*, key point 1104*b* can be mapped to key point 1106*b*, key point 1104*c* can be mapped to 1106*c*, key point 1104*d* can be mapped to key point 1106*d* and key point 1104*f* can be mapped to key point 1106*e*. In this example, all of the key points between shoe 1104 and 1106 match.

Next, the images of shoe 1104 and 1106 can be overlapped. In one example, the images can be initially interposed over one another. As another example, key point 1104*a* can be matched to key point 1104*b* as a zero distance. In general, a common coordinate system needs to be determined. Then, pixel distances between the other key points can be calculated. These distances can be summed to generate an error, such as error 1128. Error 1128 can be the error between image two and three in the series at the first iteration.

The initial angular position of the shoe 1106 is set at an angle 1120. This angle can be the initial angle as captured in the original image data. In one embodiment, the initial orientation of the image can be adjusted to account for sensor data, such as IMU data, from a sensor package. For example, if the IMU data indicated the camera was rotated some degrees about the optical axis, then the initial image can be rotated this amount to account for this effect.

In one embodiment, a distance can be known between the camera and an object in a series of images. In particular, distance can be known between the camera and various pixels in the images. When the distances are known, a distance can be picked or determined, such as an average distance to the object over the series of images. Then, an average distance to the object can be generated for each image.

The ratio of the average distance to the object in a single image versus the average distance to the object over a series of images can be used to generate an initial scaling factor. For example, each image can be initially scaled at the first iteration so that the ratio of the average distance to the object in each image to the average distance to the object over the series of images is one. Other types of scaling factors can be developed between images and this example is provided for illustrative purposes only. For example, scaling factors can be determined based upon average distances to key points.

In particular embodiments, translations, rotation operation can be developed that utilizes the errors, such as error 1126 and 1128. For example, a translation, rotation and/or scaling operation 1130 can be performed on the image including shoe 1102 to generate image 1152. A translation, rotation and/or scaling operation 1132 can be performed on the image including shoe 1104 to generate image 1154. Further, a translation, rotation and/or scaling operation 1134 can be performed on image 1106 to generate image 1156.

An objective of the operations can be to minimize the global errors. To relate the errors to translation, rotation and scaling operations, gradients can be determined, such as the changes in error when an image is translated horizontally or vertically from its initial position slightly, the changes in error when the image is rotated counter-clockwise or clockwise slightly or when the image is scaled up or down slightly. For example, error gradients between images 1102 and 1104 can be determined from perturbing image 1102 slightly in one or more of the translational, rotational, scale directions slightly while holding the position of image 1104 constant. The error gradients can be a change in error due to a change in translation, rotation and/or scaling.

Further, image 1104 can be perturbed slightly while holding the position of images 1102 and 1106 constant. Error gradients can be determined between image 1102 and 1104. Further, error gradients can be determined between image 1104 and 1106. This process can be repeated for the various image pairs in the image series. The error gradients can be used to determine the translation, rotation and/or scaling operations 1130, 1132 and 1134. The objective can be to apply a number of iterations which drive the global error to some minimum value where the gradients provide some directional indications of how to transform the images to minimize the errors.

The transformation operations lead to images 1152, 1154 and 1156 respectively. Image 1152 has approximately maintained its position after the operations as compared to image 1104. Image 1154 has been translated down and to the right as compared to the position of image 1104. Image 1156 has been rotated clockwise as angle 1124 is smaller than angle 1120. Further, the image has been shifted to the left as can be seen from positions of key point 1106e relative to line 1116.

With the new positions of the images 1150, 1152 and 1156, new errors 1136 and 1138 can be determined based upon the key point locations. For example, error 1136 is the error between image one and two in the image series after the first iteration, i1. Error 1138 is the error between image two and three after the first iteration, i1. The new errors can be used to determine a global error.

When the global error satisfies a convergence constraint, then a common image size can be selected for the image series and then operations such as described above with respect to FIGS. 10A and 10B, can be used to generate a series of images with a smoothed trajectory. This series of images can be used to generate an MVIDMR. When the global error doesn't satisfy a convergence constraint, then a new iteration can be performed where a transformation operation is applied to each of the images in the image series. This process can be repeated until convergence is reached or some maximum number of iterations is exceeded.

FIG. 12 illustrates camera trajectory smoothing formulated as a factor graph 1200. A factor graph is a type of probabilistic graphical model. A factor graph is a bipartite graph representing the factorization of a function. In probability theory and its applications, factor graphs can be used to represent factorization of a probability distribution function, enabling efficient computations, such as the computation of marginal distributions through the sum-product algorithm.

In FIG. 12 and in factor graph 1200, a number of variable nodes can be provided each node can be associated with image data from an image series and IMU data from a sensor package where the IMU data is associated with the image. Each variable can be associated with an image in an image series, such as image series 1000 from FIG. 10A. For example, variables 1212 can be associated with IMU data 1202 and image data 1002a, variables 1214 can be associated with IMU data 1206 and image data 1002b, followed by other images and IMU data not shown. Then, variables 1216 can be associated with IMU data 1208 and 10021 and variables 1218 can be associated with IMU data 1210 and 1002m.

Constraints, which can be errors, can be defined between the variables. The error constraints can be based upon the key point matching derived from the image data and, optionally, the IMU data. The IMU data provide an amount of angular rotation around the optical axis. This error can be used to determine rotational operations on the images. For example, constraint 1220a and 1222a can be based upon the rotational IMU data.

Key point matching can also be used to determined rotational errors. In addition, the key point matching can be used to determine translational and scaling errors as described above with respect to FIG. 12. The error constraints associated with the key point matching can associated with terms 1220b and 1222b.

The error terms associated with the rotational error determined from the IMU data and the rotational error determined from the key point matching can be each weight. The weighting can determine the relative effects of each term. For example, the IMU data can be given more weight than the rotational error from the key point matching, vice versa or the IMU data and key point matching data can be given about the same amount weight. The amount of weight given to each term can affect the rotational operations and final transformation performed on each image.

In one embodiment, depth data can be received from a depth sensor or based upon images received from two cameras. The depth data can be used to set up an error constraint related to the scaling. As described above, the key point matching can also be used to generate an error constraint related to scaling. These two error terms from different sources can be weighted to determine the relative contribution of one over the other as described above in a manner with respect to FIG. 11.

In one embodiment, an image series can include a three hundred sixty degree view of an object. In some instances, the IMU data can be used to determine a three hundred sixty degree view of the object is captured. When a three hundred sixty degree view of an object or something close is captured in the image series, error constraints can be set up between the first and last image in the image series, such as error constraints involving the IMU data and error constraints involving the key point tracking.

For example, error constraint 1224a can be associated with rotational errors between variables 1212 and variables 1218 representing the first and last image in the image series 1000. In addition, the error constraint 1224b can be associated with translation, rotation and scaling errors. The error constraints 1224a and 1224b may only be used when a three hundred sixty degree view of an object is captured or desired in the MVIDMR.

The error constraints and variables can be used to drive an optimization problem where each of the images in the image series are transformed, such as described above with respect to FIGS. 10A, 10B and 11. The transformations can result in image transformations consistent with a trajectory which is smoother than the original trajectory the camera travelled. These images can be used to generate an MVIDMR.

Figure 13:
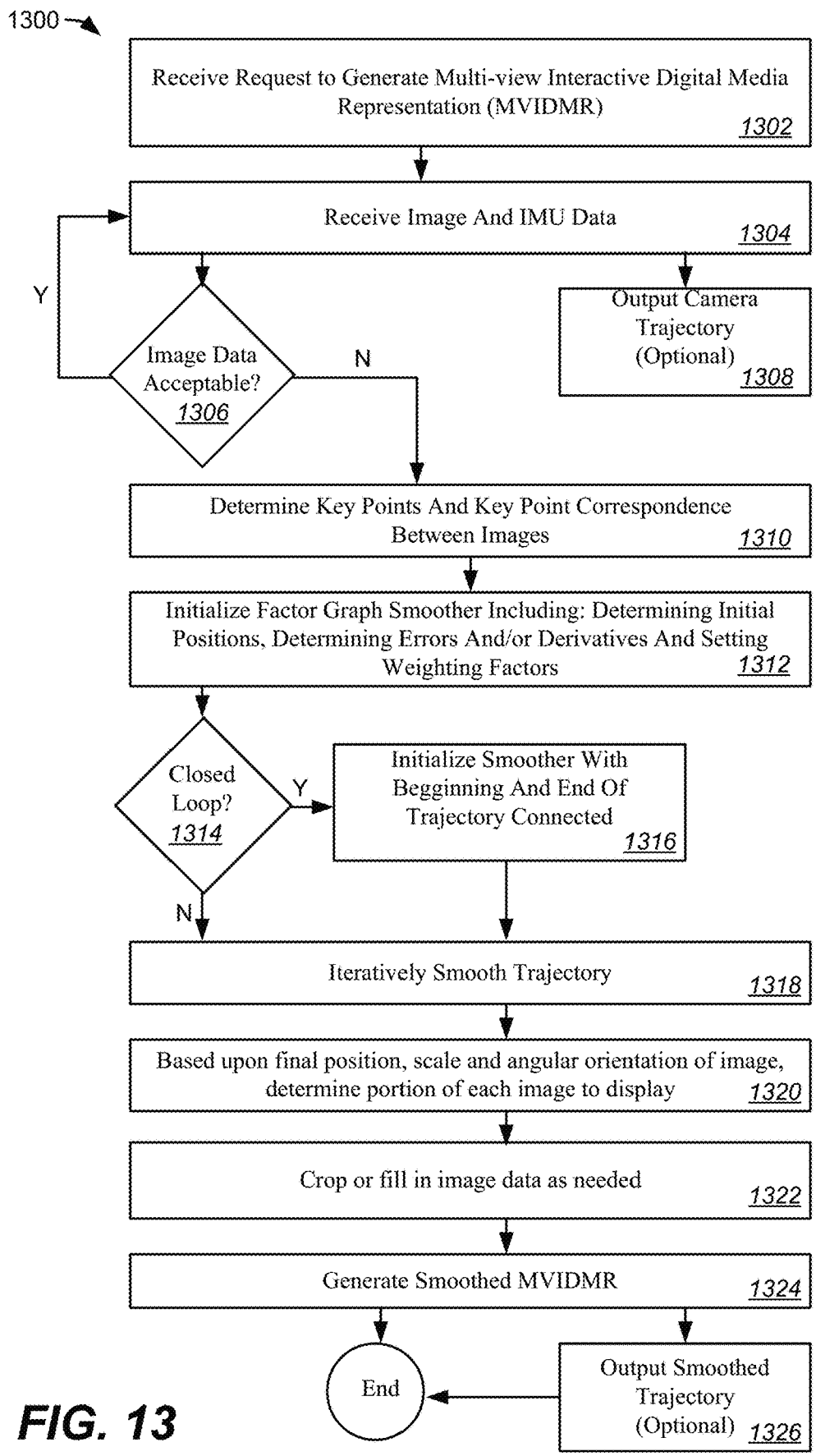
FIG. 13 illustrates a method for generating an MVIDMR using camera trajectory smoothing in accordance with embodiments of the present invention.

FIG. 13 illustrates a method 1300 for generating an MVIDMR using camera trajectory smoothing. In 1302, a request can be received to generate an MVIDMR. In 1304, image data and IMU data can be received from a device. In alternate embodiment, depth data can be received. In 1308, the original trajectory from the camera can be output to display.

In 1306, a prescreening can be done on the image data from the image series. For example, initial key point matching can be done to determine an amount of overlap between the images. In another example, the IMU data can be examined for abrupt changes. When the image data from the image series is not acceptable, additional image data can be captured in 1304. In 1306, when the image data is acceptable, the method can advance to the trajectory smoothing steps.

In 1310, key points and key point correspondence between images in the image series can be determined. In 1312, the key point data and, optionally, IMU data can be used to determine an initial position of the images in the factor graph smoother. For instance, IMU data can be used to correct for a rotation of the image. In addition, error constraints and/or error derivatives can be determined. The error constraints and derivatives can be used to determine translation, rotation and scaling operations that transform each image. In addition, weighting factors for rotational constraints derived from key point matching and, optionally, IMU data can be determined.

In 1314, a determination can be made as to whether the image series captures a closed loop. For example, IMU data can be used to determine an angular view captured of the object. In 1316, when it is determined there is a closed loop, key point matching can be performed between the first and last images in the image series. Then, error constraints using the IMU data and key point matching data can be initialized between the first and last images in the image series.

In 1318, the images can each be transformed to generate a smoother trajectory. The transformation can involve one or more of translation, rotation and/or scaling operation performed on each image. In 1320, based upon the final position, scale and angular orientation of each image, a portion of each to display can be determined. This portion which is used can depend on a size of a common image size that is selected. The common image size can be smaller than the original image size.

In 1322, the transformed images can be cropped as needed according to the selected common image size. In some embodiments, selected portion of the transformed image may not entirely fill the selected common image size. In this instance, the portion of the common image size can be filled in with additional background data. In 1324, transformed image data can be used to generate a smoothed MVIDMR, which can be output.

In 1326, a smoothed trajectory, associated with the smoothed image data can be output, alone or in conjunction with the original trajectory. The smoothed trajectory can be determined from the transformation performed to each image. The transformation can be used to determine a new camera position where the data can have been captured.

In some implementations, multiple MVIDMRs may be jointly stabilized. By way of illustration, MVIDMRs of a 360 degree view of a car may be captured once with all doors closed and once with all doors open. Both MVIDMRs may be jointly stabilized using the disclosed techniques such that both are smooth and the transition between them is also smooth. In another example, as described above, an object may be extracted from a first MVIDMR and put it in a second MVIDMR. Then either or both of the first and second MVIDMRs may be jointly stabilized or the first MVIDMR may be stabilized in a manner that allows the best fit with the second MVIDMR.

Figure 14:
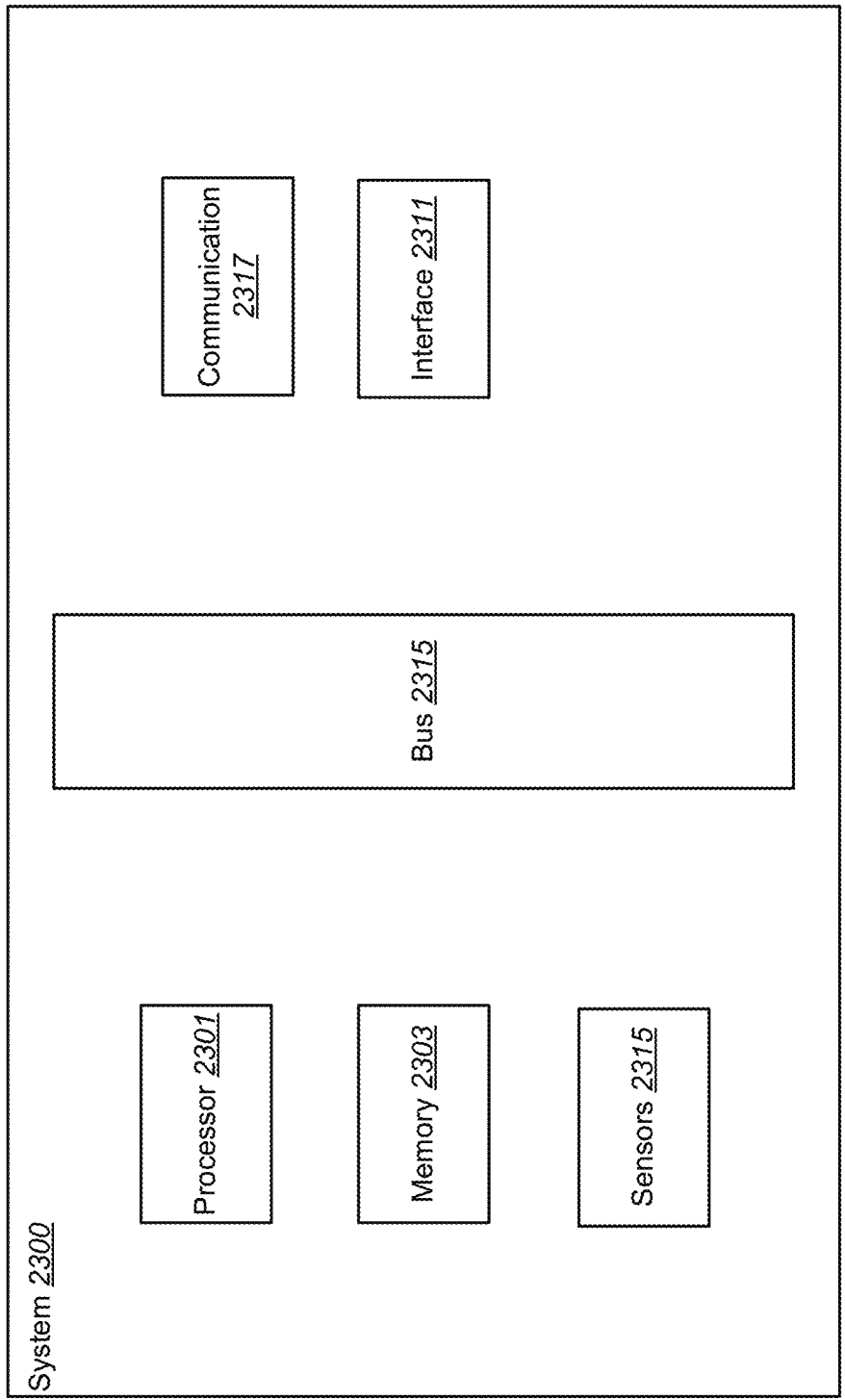
FIG. 14 illustrates a particular example of a computer system that can be used with various embodiments of the present invention.

With reference to FIG. 14, shown is a particular example of a computer system that can be used to implement particular examples of the present invention. For instance, the computer system 2300 can be used to provide multi-view interactive digital media representations according to various embodiments described above. According to particular example embodiments, a system 2300 suitable for implementing particular embodiments of the present invention includes a processor 2301, a memory 2303, an interface 2311, and a bus 2315 (e.g., a PCI bus).

The system 2300 can include one or more sensors, such as light sensors, accelerometers, gyroscopes, multi-axis magnetometers, microphones, cameras including stereoscopic capabilities or structured light cameras. Structured light cameras can be used to determine distances from the camera to objects in images. A Kinect™ uses a structured light sensor. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In one embodiment, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

As described above, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data.

One advantage of tracking objects in the manner described above in the 2-D image space is that a 3-D reconstruction of an object or objects appearing in an image don't have to be performed. The 3-D reconstruction step can be referred to as "structure from motion (SFM)" in the computer vision community and "simultaneous localization and mapping (SLAM)" in the robotics community. The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

The interface 2311 may include separate input and output interfaces, or may be a unified interface supporting both operations. Examples of input and output interfaces can include displays, audio devices, cameras, touch screens, buttons and microphones. When acting under the control of appropriate software or firmware, the processor 2301 is responsible for such tasks such as optimization. Various specially configured devices can also be used in place of a processor 2301 or in addition to processor 2301, such as graphical processor units (GPUs). The complete implementation can also be done in custom hardware. The interface 2311 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 2300 uses memory 2303 to store data and program instructions and maintained a local side cache. The program instructions may control the operation of an operating system and/or one or more applications, for example. The memory or memories may also be configured to store received metadata and batch requested metadata.

In FIG. 16, the system 2300 can be integrated into a single device with a common housing. For example, system 2300 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 2300 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a multi-view interactive digital media representation. In addition, a virtual guide can be provided to help teach a user how to view a multi-view interactive digital media representation in the wearable system. For example, the virtual guide can be provided in synthetic images output to head mounted display which indicate that the multi-view interactive digital media representation can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
    on a mobile device including a processor, a memory, a camera, a plurality of sensors, a microphone and a touchscreen display, receiving via an input interface on the mobile device a request to generate a multi-view interactive digital media representation of an object;
    receiving a set of live images from the camera on the mobile device as the mobile device moves along a trajectory wherein an orientation of the camera varies along the trajectory such that the object in the set of live images is captured from a plurality of camera views;
    receiving sensor data from the plurality of sensors;
    based upon the sensor data, determining at least an angular orientation about an optical axis of the camera for each of the live images;
    determining key points on an object in each of the live images in the set of live images;
    determining, between at least adjacent image pairs in the set of live images, correspondences between the key points in each of the image pairs;
    based upon the angular orientation about the optical axis of each of the live images, generating a first error constraint for a factor graph;
    based upon the correspondences between the key points in each of the image pairs, generating second error constraints for the factor graph;
    based upon the first error constraint and the second error constraints for the factor graph, determining a translation operation, a rotation operation, a scaling operation or combinations thereof for each of the live images in the set of live images to generate a new set of images wherein changes from image to image in translational position, rotational position and size of the object within the new set of images are reduced as compared to the live images and
    generating from the new set the images the multi-view interactive digital media representation wherein the multi-view interactive digital media representation includes a plurality of images wherein each of the plurality of images includes the object from a different camera view such that object appears to go through a 3-D motion.

2. The method of claim 1, further comprising applying the determined translation operation, rotational operation and/or the scaling operation to each of the live images to generate an intermediate set of images wherein the new set of images is generated from the intermediate set of images.

3. The method of claim 2, further comprising selecting a common image size for the new set of images and determining whether to crop all or a portion of each of the intermediate set of images to fit within the common image size.

4. The method of claim 3, wherein the common image size is smaller than an original size of the live images.

5. The method of claim 2, further comprising selecting a common image size for the new set of images and determining whether each of the intermediate set of images fills an entirety of the common image size.

6. The method of claim 5, when one image of the intermediate set of images doesn't fill the entirety of the common image size, further comprising selecting image data so that the entirety of the common image size is filled for the one image.

7. The method of claim 6, wherein the image data is background which surrounds the object.

8. The method of claim 7, wherein the background is selected from another image in the intermediate set of images.

9. The method of claim 1, further comprising determining the live images capture a three hundred sixty degree view of the object.

10. The method of claim 9, further comprising configuring the factor graph to determine the first error constraint and second error constraints between a first image in the set of live images and a further image in the set of live images.

11. The method of claim 10, further comprising determining first key points in the first image and second key points in the last image and determining correspondences between the first key points and the second key points.

12. The method of claim 9 further comprising determining the live images capture approximately capture the three hundred sixty degree view of the object using the sensor data from the plurality of sensors.

13. The method of claim 1, further comprising determining a first weighting factor for the first error constraint and a second weighting factor for the second error constraints wherein the first weighting factor and the second weighting factor are used to determine how much each of the first error constraint and the second error constraints contribute to the rotation operation performed on each of the live images.

14. The method of claim 1, further comprising receiving distance data associated with the object in each of the live images, based upon the distance data determining a third error constraint for the factor graph wherein the third error constraint is used to determine how to scale each image.

15. The method of claim 14, wherein the distance data is based upon image data received from a second camera on the mobile device.

16. The method of claim 14, wherein the distance data is based upon a distance sensor located on the mobile device.

17. The method of claim 14, further comprising determining a first weighting factor for the second error constraints and a second weighting factor for the third error constraints wherein the first weighting factor and the second weighting factor are used to determine how much each of the second error constraints and the third error constraint contribute to the scaling operation performed on each of the live images.

18. The method of claim 1, when the plurality of images is output to the touchscreen display the object appears to undergo a 3-D rotation wherein the 3-D rotation of the object is generated without a 3-D polygon model of the object.

19. The method of claim 18, wherein the 3-D rotation is a three hundred sixty degree rotation.

20. The method of claim 1, where a portion of the plurality of sensors is incorporated in an inertial measurement unit and at least a portion of the sensor data is from the inertial measurement unit.

21. The method of claim 1, wherein the set of live images are scaled to generate the new set of images such that the multi-view interactive digital media representation is generated from the new set of images without inclusion of additional image information.

\* \* \* \* \*